(12) United States Patent
Tsai et al.

(10) Patent No.: US 11,240,829 B2
(45) Date of Patent: Feb. 1, 2022

(54) METHODS AND APPARATUSES FOR SCHEDULING REQUEST RESOURCE PRIORITIZATION FOR BEAM FAILURE RECOVERY

(71) Applicant: Hannibal IP LLC, Frisco, TX (US)

(72) Inventors: Hsin-Hsi Tsai, Taipei (TW); Heng-Li Chin, Taipei (TW); Chie-Ming Chou, Taipei (TW)

(73) Assignee: Hannibal IP LLC, Frisco, TX (US)

(*) Notice: Subject to any disclaimer, the term of this patent is extended or adjusted under 35 U.S.C. 154(b) by 0 days.

(21) Appl. No.: 16/937,414

(22) Filed: Jul. 23, 2020

(65) Prior Publication Data

US 2021/0029724 A1   Jan. 28, 2021

Related U.S. Application Data

(60) Provisional application No. 62/878,973, filed on Jul. 26, 2019.

(51) Int. Cl.
*H04W 72/12* (2009.01)
*H04W 28/02* (2009.01)
*H04W 72/04* (2009.01)

(52) U.S. Cl.
CPC ... *H04W 72/1242* (2013.01); *H04W 28/0278* (2013.01); *H04W 72/046* (2013.01); *H04W 72/1268* (2013.01)

(58) Field of Classification Search
CPC ......... H04W 72/1242; H04W 28/0278; H04W 72/046; H04W 72/1268
See application file for complete search history.

(56) References Cited

U.S. PATENT DOCUMENTS

2018/0054348 A1* 2/2018 Luo .................. H04W 52/16
2018/0278467 A1* 9/2018 John Wilson ....... H04W 72/046
(Continued)

FOREIGN PATENT DOCUMENTS

CN    108702763 A    10/2018
WO    2019032882 A1   2/2019

OTHER PUBLICATIONS

Intel Corporation Summary on L1-SINR and SCell BFR 3GPP TSG RAN WG1 Meeting #97 R1-1907674 May 17, 2019(May 17, 2019) the whole document.

(Continued)

*Primary Examiner* — Dinh Nguyen
(74) *Attorney, Agent, or Firm* — Sul Lee Law Firm PLLC

(57) ABSTRACT

A method for Scheduling Request (SR) resource prioritization for Beam Failure Recovery (BFR) includes a User Equipment (UE) receiving a first SR configuration from a Base Station (BS), receiving a second SR configuration from the BS, triggering a first SR procedure for a BFR procedure based on the first SR configuration, triggering a second SR procedure for a Buffer Status Report (BSR) procedure based on the second SR configuration, in a case that the first SR procedure and the second SR procedure are triggered and not cancelled and the first SR resource overlaps the second SR resource in the time domain, prioritizing the first SR resource over the second SR resource, and transmitting an SR on the first SR resource after prioritizing the first SR resource over the second SR resource.

20 Claims, 7 Drawing Sheets

(56) References Cited

U.S. PATENT DOCUMENTS

| | | | | |
|---|---|---|---|---|
| 2018/0324723 A1* | 11/2018 | Akkarakaran | ........ | H04W 72/04 |
| 2018/0368126 A1* | 12/2018 | Islam | .................... | H04L 5/1469 |
| 2019/0253941 A1* | 8/2019 | Cirik | ................ | H04W 36/0077 |
| 2019/0289661 A1* | 9/2019 | Chen | ................ | H04W 72/1284 |
| 2019/0306875 A1* | 10/2019 | Zhou | ................ | H04W 72/1284 |
| 2019/0349061 A1* | 11/2019 | Cirik | .................... | H04B 7/0617 |
| 2020/0344788 A1* | 10/2020 | Li | .................... | H04W 72/1284 |

OTHER PUBLICATIONS

VIVO Discussion on Enhancements on Multi-Beam Operation 3GPP TSG RAN WG1 Meeting #95 R1-1812324 Nov. 16, 2018(Nov. 16, 2018) the whole document.

* cited by examiner

METHODS AND APPARATUSES FOR SCHEDULING REQUEST RESOURCE PRIORITIZATION FOR BEAM FAILURE RECOVERY

CROSS-REFERENCE TO RELATED APPLICATION(S)

The present disclosure claims the benefit of and priority to provisional U.S. Patent Application Ser. No. 62/878,973 ("the '973 provisional"), filed on Jul. 26, 2019, entitled "Method and Apparatus for Handling Overlap Condition of Beam Failure Recovery." The content(s) of the '973 provisional are fully incorporated herein by reference for all purposes.

FIELD

The present disclosure generally relates to wireless communications, and more particularly, to methods and apparatuses for Scheduling Request (SR) resource prioritization for Beam Failure Recovery (BFR).

BACKGROUND

With the tremendous growth in the number of connected devices and the rapid increase in user/network traffic volume, various efforts have been made to improve different aspects of wireless communication for the next generation wireless communication system, such as the fifth generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements of wireless communication for the next generation wireless communication system.

SUMMARY

The present disclosure is directed to methods and apparatuses for SR resource prioritization for BFR.

According to an aspect of the present disclosure, a method performed by a User Equipment (UE) for SR resource prioritization for BFR is provided. The method includes the UE receiving, from a Base Station (BS), a first Scheduling Request (SR) configuration indicating a first SR index associated with a first SR resource, receiving, from the BS, a second SR configuration indicating a second SR index associated with a second SR resource, triggering a first SR procedure for a BFR procedure based on the first SR configuration, triggering a second SR procedure for a Buffer Status Report (BSR) procedure based on the second SR configuration, and in a case that the first SR procedure and the second SR procedure are triggered and not cancelled, and the first SR resource overlaps the second SR resource in a time domain, prioritizing the first SR resource over the second SR resource, and transmitting an SR on the first SR resource rather than the second SR resource after prioritizing the first SR resource over the second SR resource.

According to another aspect of the present disclosure, a UE is provided. The UE includes a memory and at least one processor coupled to the memory. The at least one processor is configured to receive, from a BS, a first SR configuration indicating a first SR index associated with a first SR resource, receive, from the BS, a second SR configuration indicating a second SR index associated with a second SR resource, trigger a first SR procedure for a BFR procedure based on the first SR configuration, trigger a second SR procedure for a BSR procedure based on the second SR configuration, and in a case that the first SR procedure and the second SR procedure are triggered and not cancelled, and the first SR resource overlaps the second SR resource in a time domain, prioritize the first SR resource over the second SR resource, and transmit an SR on the first SR resource rather than the second SR resource after prioritizing the first SR resource over the second SR resource.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
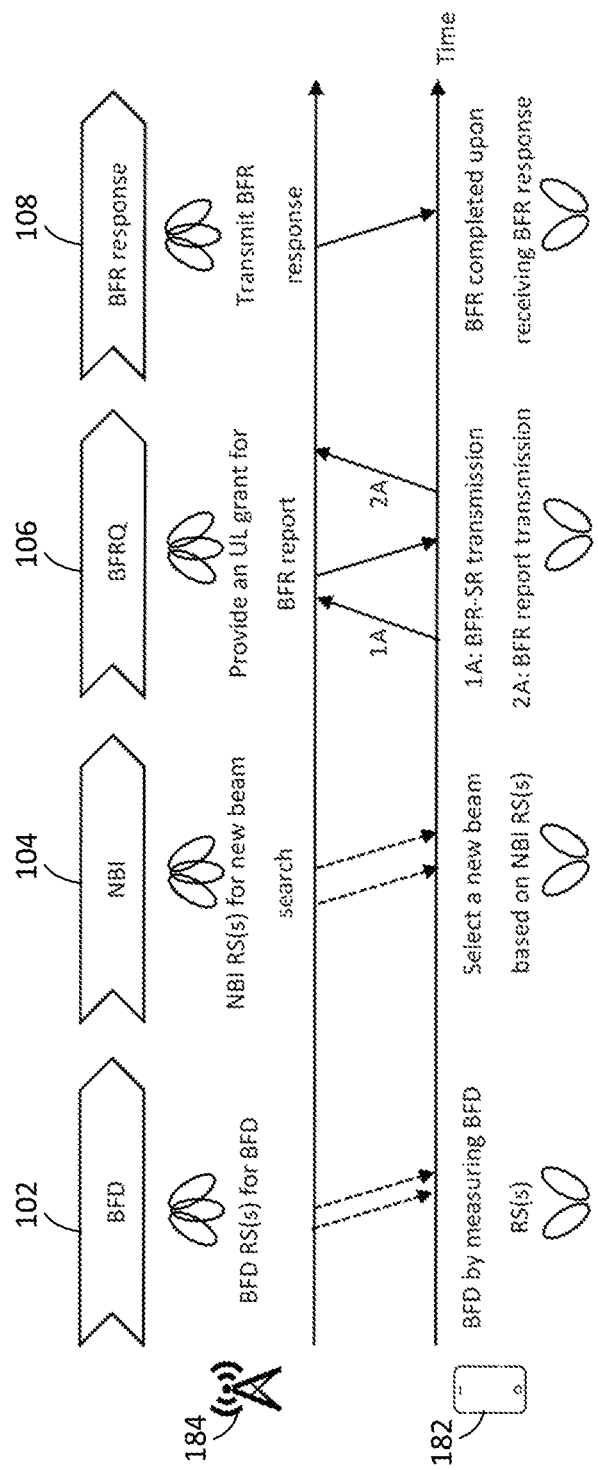
FIG. 1 illustrates a BFR procedure triggered for an SCell according to an implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

The term "and/or" herein is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" used herein generally represents that the former and latter associated objects are in an "or" relationship.

Additionally, for the purpose of non-limiting explanation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Any two or more than two of the following paragraphs, (sub)-bullets, points, actions, behaviors, terms, or claims described in the present disclosure may be combined logically, reasonably, and properly to form a specific method. In addition, any sentence, paragraph, (sub)-bullet, point, action, behaviors, terms, or claims described in the present disclosure may be implemented independently and separately to form a specific method.

Dependency, e.g. "based on", "more specifically", "preferably", "In one embodiment", or etc., in the following invention(s) is just one possible example which may not restrict the specific method.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, a LTE-Advanced (LTE-A) system, or a LTE-Advanced Pro system) typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a Next-Generation Core (NGC), or an Internet), through a Radio Access Network (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA BS in connection with the SGC, a next generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present disclosure should not be limited to the above mentioned protocols.

The BS may be operable to provide radio coverage to a specific geographical area using a plurality of cells being included the RAN. The BS may support the operations of the cells. Each cell is operable to provide services to at least one UE within its radio coverage. In some implementations, each cell (often referred to as a serving cell) may provide services to serve one or more UEs within its radio coverage, (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells. In Multi-RAT Dual Connectivity (MR-DC) cases, the primary cell of a Master Cell Group (MCG) or a Secondary Cell Group (SCG) may be called an SpCell. A Primary Cell (PCell) may refer to the SpCell of an MCG. A Primary Secondary Cell (PSCell) may refer to the SpCell of an SCG. MCG means a group of serving cells associated with the Master Node (MN), comprising of the SpCell and optionally one or more SCells. SCG means a group of serving cells associated with the Secondary Node (SN), comprising of the SpCell and optionally one or more SCells.

As discussed above, the frame structure for NR is to support flexible configurations for accommodating various next generation (e.g., 5G) communication requirements, such as eMBB, mMTC and URLLC, while fulfilling high reliability, high data rate and low latency requirements. The orthogonal frequency-division multiplexing (OFDM) technology as agreed in 3rd Generation Partnership Project (3GPP) may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. In addition, a sidelink resource may also be provided in an NR frame to support ProSe services.

An objective of the 5G on new RAT is to identify and develop technology components needed for NR systems which are able to use any spectrum band ranging up to at least 100 GHz. Supporting carrier frequencies up to 100 GHz brings a number of challenges in the area of radio propagation. As the carrier frequency increases, the path loss also increases.

In lower frequency bands (e.g., <6 GHz) the required cell coverage may be provided by forming a wide sector beam for transmitting DL common channels. However, when a wide sector beam on higher frequencies (e.g., >6 GHz) is utilized, the cell coverage may be reduced with the same antenna gain. Thus, higher antenna gain may be needed to compensate the increased path loss to provide the required cell coverage on the higher frequency bands.

Beamforming is a signal processing technique used in antenna arrays for directional signal transmission/reception. With beamforming, a beam may be formed by combining elements in a phased array of antennas in such a way that signals at particular angles experience constructive interference while others experience destructive interference. Different beams may be utilized simultaneously using multiple arrays of antennas. To increase the antenna gain over a wide sector beam, larger antenna arrays (e.g., the number of antenna elements ranging from tens to hundreds) may be used to form high gain beams.

Nonetheless, the beam width of high gain beams may be narrow compared to a wide sector beam so multiple beams for transmitting DL common channels may be needed to cover the required cell area. The number of concurrent high gain beams that an access point is able to form may be limited by the cost and complexity of the utilized transceiver architecture. In practice, on higher frequencies, the number of concurrent high gain beams may be much less than the total number of beams required to cover the cell area. In other words, the access point is able to cover only part of the cell area by using a subset of beams at any given time.

As a consequence, a BS (e.g., gNB) may utilize multiple beams to cover the whole coverage area and each UE may be associated with one of those beams. When a UE moves and/or the environment varies, the best beam for the UE may change. The Layer 1 (L1)/Layer 2 (L2) beam management procedure (or L1/L2 inter-beam mobility management procedure) may be used to switch the current beam of a UE to a new beam. The beam may be used on a DL control channel. The beam design may be related to the coverage distance and the robustness to UE mobility. Considering the low data rate requirement but high reliability requirement on the control channel, the beam may need to be wide enough to allow reasonable UE mobility and potential blockage. Choosing narrow beams may generate unnecessary frequent beam switching and potentially frequent connection loss on the control channel.

However, the misalignment on beam may result in the loss of ongoing link of the control channel (which may be referred to as a "beam failure (event)"). In this case, the gNB may not be able to use the same beam management procedure to switch to a new beam. Thus, the BFR mechanism may be utilized. The BFR mechanism may be applied by a UE.

A UE may detect a beam failure event by measuring certain DL Reference Signal(s) (RS(s)), control channel(s) and/or data channel(s). For example, during the beam failure detection, a UE may detect a very low Reference Signal Received Power (RSRP) of the current serving beam based on the measurement of the DL RS used for beam management. If beam failure is detected, the UE may notify the gNB of the beam failure event through certain UL transmission(s). Then the gNB may act (e.g., change the serving beam) accordingly.

A UE may be configured with a BFR procedure during which the UE may inform the serving gNB of a new Synchronization Signal Block (SSB) or a Channel State Information Reference Signal (CSI-RS) when beam failure is detected on the serving SSB(s)/CSI-RS(s). For Beam Failure Detection (BFD), the gNB may configure the UE with BFD RS(s) (e.g., SSB(s) or CSI-RS(s)), and the UE may declare/detect beam failure when the number of beam failure instance indications from the Physical (PHY) layer reaches a configured threshold before a configured timer expires. An SSB-based BFD procedure may be performed based on the SSB associated with the initial DL Bandwidth Part (BWP) and may only be configured for the initial DL BWP and for the DL BWP(s) containing the SSB associated with the initial DL BWP. For other DL BWPs, a BFD procedure may only be performed based on CSI-RS.

In some implementations, when beam failure is detected (e.g., on an SpCell), a UE may perform a Random Access Channel (RACH)-based BFR procedure including:

triggering a BFR procedure by initiating a Random Access procedure on the SpCell; and selecting a suitable beam to perform the BFR procedure (e.g., if the gNB has provided the UE with dedicated Random Access resources for certain beams, those beams may be prioritized to be selected by the UE).

Upon completion of the Random Access procedure, the BFR procedure may be considered complete.

In the 3GPP Release 15 (Rel-15), the RACH-based BFR mechanism may only be applied for the SpCell (e.g., a PCell and/or a PSCell). In this case, if beam blockage and/or beam failure happens on an SCell, a UE may rely on the Network (NW) to handle it.

For example, an NW may determine that beam failure is detected on an SCell based on the absence of Acknowledgement (ACK)/Negative Acknowledgement (NACK) feedback for the scheduled DL transmission in the SCell, or depending on the Channel Quality Indicator (CQI) report for the SCell. If beam failure occurs, the NW may release this SCell and re-schedule the data transmission. However, this method may decrease the scheduling efficiency and increase the signaling propagation latency of the higher layer(s) (e.g., the Radio Resource Control (RRC) layer). In some implementations, in order to quickly recover a beam (e.g., change the serving beam) from the beam failure on the SCell, the signaling configuration and/or the beam failure recovery procedure may be provided to support BFR on the SCell.

FIG. 1 illustrates a BFR procedure triggered for an SCell according to an implementation of the present disclosure. As illustrated in FIG. 1, the BFR procedure triggered for an SCell includes actions 102, 104, 106 and 108. In some implementations, one or more of actions 102, 104, 106 and 108 may be omitted from the BFR procedure triggered for an SCell.

In action 102, a BFD operation may be performed. During the BFD operation, a BFD RS (e.g., an SSB and/or a CSI-RS) may be explicitly or implicitly configured by the BS 184 for the UE 182 to detect a beam failure event. For example, the PHY layer of the UE 182 may measure the radio link quality according to the BFD RS. The PHY layer of the UE 182 may provide a beam failure instance indication to the higher layer (e.g., the Medium Access Control (MAC) entity) when the radio link quality is worse than a threshold within a specific period of time.

From the perspective of the MAC entity of the UE 182, the beam failure event may be detected if the number of (consecutive) detected beam failure instances exceeds a configured maximum number (e.g., beamfailureInstanceMaxCount). In some implementations, the beamfailureInstanceMaxCount may be configured based on a BWP/cell/subset of cell group/cell group basis. On the other hand, the UE 182 may use a counter to count the number of beam failure instances from the PHY layer (e.g., BFI_COUNTER). In some implementations, the BFI_COUNTER may be applied based on a BWP/cell/subset of cell group/cell group basis. In one implementation, the value of the BFI_COUNTER may be reset when a BFD timer (e.g., beamFailureDetectionTimer) maintained at the UE 182 expires. In some implementations, the beamFailureDetectionTimer may be configured based on a BWP/cell/subset of cell group/cell group basis.

In some implementations, when a beam failure event is detected on an SCell(s), the UE 182 may trigger a BFR procedure for the SCell(s) and/or trigger a SR procedure for BFR.

In action 104, a New Beam Identification (NBI) procedure may be performed. During the NBI procedure, the UE 182 may search for and select a new beam (or "candidate beam") for the SCell(s) (on which the beam failure event is detected) based on the measuring result for the NBI RS. For example, the UE 182 may select a beam of which the L1-RSRP measurement result is higher than a threshold as a candidate beam for the SCell(s).

In action 106, a Beam Failure Recovery reQuest (BFRQ) operation may be performed. During the BFRQ operation, the UE 182 may transmit a BFR-Scheduling Request (SR) over a PCell, a PSCell, and/or an SCell (denoted as action "1A" in FIG. 1). The BFR-Scheduling Request (BFR-SR) may be an SR for BFR (e.g., a specific SR indicated by an Information Element (IE) schedulingRequestID-BFR-SCell), which may be used to inform the BS 184 of a beam failure event detected on the SCell(s) and/or to request an UL resource (e.g., to transmit more information about the beam failure event). In some implementations, whether the UE 182 transmits the BFR-SR may depend on whether there is available UL resource(s) (for transmitting the BFR report). For example, the UE 182 may not transmit the BFR-SR if there is available UL resource(s) for the UE to use and/or if there is UL resource(s) that can be used for BFR report transmission (e.g., the UL resource(s) can accommodate the BFR report).

In some implementations, if there is UL resource(s) available for BFR report transmission (e.g., the UL resource(s) can accommodate the BFR report), the UE 182 may (directly) transmit a BFR report (e.g., based on a MAC CE) to the BS 184 (denoted as "2A" in FIG. 1). The BFR report may include at least one of the information about the beam failed CC(s) and/or beam failed serving cell(s) (e.g., an SpCell and/or SCell) via the Cell index(s), the information about the new beam(s)/candidate beam(s) (e.g., the UE 182 may select the new beam/candidate beam by measuring the NBI RS(s)), and the no-new-beam information. In one implementation, the no-new-beam information may be used to indicate that the UE 182 does not find any (qualified) new beam/candidate beam (e.g., the UE 182 does not find any new beam/candidate beam with the corresponding L1-RSRP higher than a threshold). In one implementation, the BFR report may indicate the presence of new beam/candidate beam. In addition, in some implementations, the BFR report may be transmitted (only) via the UL grant which is requested by the BFR-SR. In some implementations, the BFR report may be transmitted via arbitrary UL grant(s) (e.g., an UL grant provided in a Random Access Response (RAR), a dynamic UL grant provided via a Physical Downlink Control Channel (PDCCH), and/or a configured grant).

In action 108, a BFR response operation may be performed. During the BFR response operation, the UE may attempt to monitor a BFR response (e.g., via PDCCH monitoring) from the BS 184 after transmitting a BFRQ (e.g., a BFR-SR and/or a BFR report). In some implementations, the BFR response may be transmitted on a PCell, a PSCell and/or an SCell. In some implementations, the BFR response may be transmitted on an CC and/or a serving cell on which the UE 182 transmits the BFRQ (e.g., the SCell on the beam failure event is detected). Upon receiving the BFR response, the UE 182 may consider that the BFR procedure triggered for an SCell is completed.

Overlap of UL Resources

In (a BWP of) a single cell, two or more UL resources for transmission may be overlapped/collided in the time domain, where each of the overlapped UL resources may be, for example, a Physical Random Access Channel (PRACH) resource, a Physical Uplink Control Channel (PUCCH) resource, or a Physical Uplink Shared Channel (PUSCH)

resource. A UE may select only one of the UL resources for transmission at a point of time due to the limited UE capability. For example, in the current SR mechanism, the UE may not signal (or "transmit") an (regular) SR on a valid PUCCH resource for SR (e.g., a PUCCH resource that is valid for an SR transmission) if the PUCCH resource (occasion) for the SR transmission overlaps an Uplink Shared Channel (UL-SCH) resource (occasion) (e.g., a dynamic scheduled PUSCH resource and/or a configured PUSCH resource). The UE may only perform the PUSCH transmission if the PUCCH resource (occasion) for the SR transmission overlaps an UL-SCH resource (occasion).

An example Text Proposal (TP) for the UE behavior in Release 15 is in Table 1.

It is noted that compared to a BFR-SR procedure (which is trigger for BFR procedure), a regular SR procedure may be triggered for a BSR procedure. For example, a UE may trigger a BSR procedure when the UL data for a Logical Channel (LCH) becomes available. During the BSR procedure, the UE may trigger a regular SR procedure when the UE needs to request UL-SCH resource for transmitting BSR MAC CE. During the regular SR procedure, the UE may attempt to transmit a regular SR when there is valid PUCCH resource for transmitting the regular SR.

In addition, a UE may be configured with an SR prohibit timer (e.g., sr-ProhibitTimer). When the SR prohibit timer is running, the UE may be prohibited from transmitting an (regular) SR even if the corresponding regular SR procedure

TABLE 1

As long as at least one SR is pending, the MAC entity shall for each pending SR:
   1> if the MAC entity has no valid PUCCH resource configured for the pending SR:
      2> initiate a Random Access procedure on the SpCell and cancel the pending SR.
   1> else, for the SR configuration corresponding to the pending SR:
      2> when the MAC entity has an SR transmission occasion on the valid PUCCH
         resource for SR configured; and
      2> if sr-ProhibitTimer is not running at the time of the SR transmission occasion; and
      2> if the PUCCH resource for the SR transmission occasion does not overlap a
         measurement gap; and
      2> if the PUCCH resource for the SR transmission occasion does not overlap an UL-
         SCH resource:
         3> if SR_COUNTER < sr-TransMax:
            4> increment SR_COUNTER by 1;
            4> instruct the physical layer to signal the SR on one valid PUCCH resource for
               SR;
            4> start the sr-ProhibitTimer.

In addition, the UL resources (e.g., a PUCCH resources) for a BFR-SR transmission may overlap other UL resources (e.g., PRACH/PUSCH/PUCCH resources) in the time domain (e.g., in one or more symbols/slots). However, the purposes of SR transmission and BFR-SR transmission may be different. For example, the purpose of SR transmission may be requesting an UL resource for data transmission (e.g., in a case that there is no available PUSCH resource allocated to the UE). Thus, if the PUCCH resource for SR transmission overlaps a PUSCH resource, the UE may not need to transmit the SR, because the UE has received the PUSCH resource. For example, the UE may transmit the BSR via the PUSCH resource to further request more UL resources for data transmission.

On the other hand, the purpose of BFR-SR transmission may include informing the NW that beam failure happens on a serving cell(s) (e.g., a beam failure event is detected on the serving cell(s)), and/or to request a (specific) UL resource for transmitting a BFR report (e.g., a MAC CE). When beam failure occurs on the serving cell(s), the UE may not perform DL and/or UL transmission successfully on the serving cell(s) due to the radio link problem. For example, the UE may not receive any scheduling (e.g., from a PDCCH) on the serving cell(s). Also, the misalignment of the beam pair link between the NW and the UE may result in some negative impacts (e.g., transmission failure, bad resource efficiency, unnecessary power consumption, etc.). Thus, beam failure recovery may be urgent and critical compared to other transmissions. In this sense, in some implementations of the present disclosure, the UE may prioritize the BFR-SR resource (or an "SR resource for BFR") for a BFR-SR transmission over some other UL resources (e.g., a PUSCH for data transmission and/or a PUCCH for (normal) SR transmission), if the BFR-SR resource (occasion) for transmission collides with the other UL resources in the time domain.

is pending. For example, the MAC entity of the UE may not instruct the Physical (PHY) layer of the UE to transmit the SR on a valid PUCCH resource for SR. Furthermore, the UE may be configured with a BFR-SR prohibit timer for BFR-SR. When the BFR-SR prohibit timer is running, the UE may be prohibited from transmitting the BFR-SR even if the corresponding BFR-SR is pending. Therefore, in some implementations, if a regular SR procedure and a BFR-SR procedure both are pending on the UE, the UE may determine whether to transmit a BFR-SR (corresponding to the BFR-SR procedure) based on whether the SR prohibit timer and/or prohibit timer for BFR-SR is running.

For example, if the BFR-SR procedure and the regular SR procedure are pending, the UE may transmit the BFR-SR even if the SR prohibit timer is still running.

In some implementations, if the BFR-SR procedure and the regular SR procedure are pending, the UE may transmit the BFR-SR when the SR prohibit timer is not running.

In some implementations, if the BFR-SR procedure and the regular SR procedure are pending, the UE may transmit the BFR-SR regardless of the SR prohibit timer being running or not.

In some implementations, the UE may be configured with a BFR-SR prohibit timer for a BFR-SR. When the BFR-SR prohibit timer is running, the UE may be prohibited from transmitting a BFR-SR even if the BFR-SR is pending. For example, the MAC entity of the UE may not instruct the PHY layer to transmit the BFR-SR on a valid PUCCH resource for BFR-SR. Therefore, if a regular SR procedure and a BFR-SR procedure both are pending on the UE, the UE may determine whether to transmit a BFR-SR (corresponding to the BFR-SR procedure) based on whether the SR prohibit timer and/or BFR-SR prohibit timer is running.

For example, if the BFR-SR procedure and the regular SR procedure are pending, the UE may transmit an (regular) SR when the BFR-SR prohibit timer is running.

For example, when the BFR-SR prohibit timer is running, the UE may not transmit the BFR-SR on a valid PUCCH resource for a BFR-SR transmission even if the corresponding BFR-SR procedure (during which the BFR-SR may be generated and transmitted) is pending. When the BFR-SR prohibit timer is not running, the UE may transmit the BFR-SR.

In some implementations, the BFR-SR prohibit timer may be configured based on a BFR-SR (procedure) basis. For example, if the UE is configured with a first BFR-SR configuration and a second BFR-SR configuration, the UE may be configured with a first BFR-SR prohibit timer for the first BFR-SR configuration and may be configured with a second BFR-SR prohibit timer for the second BFR-SR configuration.

In some implementations, if the parameter "logicalChannelSR-Mask" is set to true for SR, the UE may not trigger an SR procedure (e.g., a regular SR procedure or a BFR-SR procedure). In some implementations, the BFR-SR transmission may not be restricted by the "logicalChannelSR-Mask" (e.g., there may be no configuration of the logicalChannelSR-Mask for the BFR-SR transmission and UE may assume that there is an NW error if the UE has received the corresponding configuration for the BFR-SR transmission (e.g., a BFR-SR configuration)). For example, the UE may not be expected to be configured with the "logicalChannelSR-Mask", or may not be expected to be configured with a "logicalChannelSR-Mask" which is set to true for the BFR-SR transmission. For example, the NW may not configure the "logicalChannelSR-Mask" to the UE, or may not set the "logicalChannelSR-Mask" to true for the BFR-SR transmission.

In some implementations, when at least one BFR-SR procedure is pending on the UE, for each pending BFR-SR, the UE may transmit a BFR-SR on an UL resource valid for the BFR-SR transmission even if this UL resource (e.g., a PUCCH resource) overlaps an UL-SCH resource (e.g., a PUSCH resource) in the time domain.

In some implementations, if the UL resource (e.g., a PUCCH resource) for a BFR-SR transmission overlaps an UL-SCH resource (e.g., a PUSCH resource) in the time domain, the UE may prioritize the UL resource for the BFR-SR transmission over the UL-SCH resource during the time occasion that the UL resource for the BFR-SR transmission overlaps the UL-SCH resource.

In some implementations, the priority of the UL resource for a BFR-SR transmission may be higher than the priority of the UL-SCH resource.

In some implementations, if the UL resource (e.g., a PUCCH resource) for a BFR-SR transmission overlaps an UL-SCH resource (e.g., a PUSCH resource), the UE may perform the BFR-SR transmission only within the time occasion that the UL resource for the BFR-SR transmission overlaps the UL-SCH resource.

In some implementations, the UE may not transmit the UL-SCH during time occasion that the UL resource for the BFR-SR transmission overlaps the UL-SCH resource.

In some implementations, if the UL resource (e.g., a PUCCH resource) for a BFR-SR transmission overlaps an UL-SCH resource (e.g., a PUSCH resource), the UE may be prevented from starting the transmission of the UL-SCH resource. Instead, the UE may perform the BFR-SR transmission.

In some implementations, if the UL resource (e.g., a PUCCH resource) for a BFR-SR transmission overlaps an UL-SCH resource (e.g., a PUSCH resource), the UE may terminate/stop the transmission of the UL-SCH resource. Instead, the UE may perform the BFR-SR transmission.

In some implementations, if the UL resource (e.g., a PUCCH resource) for a BFR-SR transmission does not overlap an UL-SCH resource (e.g., a PUSCH resource), and also the priority of the UL resource for the BFR-SR transmission is lower than the priority of the UL-SCH resource, the MAC entity of the UE may not instruct the PHY layer to transmit a BFR-SR on the valid PUCCH resource event if there is a pending BFR-SR on the UE. On the contrary, if there is an overlap between an UL resource (e.g., a PUCCH resource) for a BFR-SR transmission and an UL-SCH resource (e.g., a PUSCH resource), and also the priority of the UL resource for the BFR-SR transmission is higher than the priority of the UL-SCH resource, the MAC entity of the UE may instruct the PHY layer of the UE to transmit a BFR-SR on a valid PUCCH resource (e.g., which is valid for the BFR-SR transmission) when there is a pending BFR-SR procedure on the UE.

In some implementations, whether the priority of an UL resource for a BFR-SR transmission is higher (or lower) than the priority of an UL-SCH resource may be determined based on some characteristics of the UL-SCH resource, e.g., the Subcarrier Spacing (SCS) index, the PUSCH transmission duration, and/or the BWP/Cell information. For example, the UE may prioritize the UL-SCH transmission (e.g., the transmission on the UL-SCH resource) if the PUSCH transmission duration is shorter than a threshold, when the UL resource (e.g., a PUCCH resource) for a BFR-SR transmission overlaps an UL-SCH resource. For example, the UE may prioritize the UL-SCH transmission if the activated BWP is larger than a bandwidth threshold, when the UL resource (e.g., a PUCCH resource) for a BFR-SR transmission overlaps an UL-SCH resource. For example, the UE may prioritize the UL-SCH transmission if the Cell is a specific cell (e.g., with a specific cell index and/or related to a specific cell group), when the UL resource (e.g., a PUCCH resource) for a BFR-SR transmission overlaps an UL-SCH resource.

In some implementations, whether the priority of an UL resource for a BFR-SR transmission is higher or lower than the priority of an UL-SCH resource may be determined based on an explicit or implicit indication included in the PDCCH (and/or Downlink Control Information (DCI)) which is used to schedule the UL-SCH resource. For example, the NW may explicit or implicit indicate to the UE that the UL-SCH resource has a specific priority (e.g., a priority value/index) for transmission. The UL resource for the BFR-SR transmission may be configured by the NW with another priority (e.g., a priority value/index) via an RRC configuration.

In some implementations, the priority of the UL resource for the BFR-SR transmission may be indicated by the NW via a field of DCI, a DCI format, or a specific Radio-Network Temporary Identifier (RNTI).

In some implementations, the priority of the UL resource for the BFR-SR transmission may be determined based on the type of UL grant that schedules the UL-SCH resource (e.g., the dynamic grant, the type 1 configured grant, the type 2 configured grant, the UL grant scheduled by an RAR, etc.).

In some implementations, the priority may be pre-configured by an RRC configuration.

In some implementations, whether the priority of the UL resource for a BFR-SR transmission is higher or lower than the UL-SCH resource may be determined based on the content of the MAC Protocol Data Unit (PDU) to be transmitted on this UL-SCH resource. For example, if the MAC PDU includes the MAC subPDU(s) from a specific MAC CE(s) and/or a specific LCH(s), the UL-SCH resource for transmitting the MAC PDU may have a higher priority than that of the UL resource for a BFR-SR transmission. In another example, if the MAC PDU only includes the MAC subPDU(s) that includes a MAC SDU, or if the MAC PDU only includes the MAC subPDU(s) that includes a MAC CE, the UL-SCH resource for transmitting the MAC PDU may be given a specific priority for transmission. In another example, the priority of the UL-SCH resource may depend on the highest priority of the specific MAC CE(s) and/or data from the configured LCH(s) (which satisfies the mapping restriction of this UL-SCH resource and has data available for transmission).

In some implementations, whether the priority of the UL resource for a BFR-SR transmission is higher or lower than the UL-SCH resource may be determined based on the Component Carrier (CC) activation/deactivation status on this cell group. For example, if more than a certain number of CCs are activated, the UE may prioritize the UL-SCH transmission for a BFR-SR transmission that overlaps an UL-SCH resource (e.g., the data may be transmitted on the UL-SCH via a CC where there is no beam failure detected in the time domain).

In some implementations, whether the UE performs the prioritization (e.g., prioritizing the BFR-SR transmission over the UL-SCH transmission) may depend on whether the MAC entity has sent the corresponding MAC PDU to the PHY layer for an UL-SCH transmission. For example, if the UE has not sent the corresponding MAC PDU to the PHY layer for the UL-SCH transmission, the UE may prioritize the BFR-SR transmission over the UL-SCH transmission if certain prioritization criteria is fulfilled. On the other hand, if the UE has sent the corresponding MAC PDU to the PHY layer for the UL-SCH transmission, the UE may (or may not) prioritize the BFR-SR transmission over the UL-SCH transmission (e.g., even if the prioritization criteria is fulfilled). If the UE determines to prioritize the BFR-SR transmission over the UL-SCH transmission after the PHY layer receives the corresponding MAC PDU from the MAC entity/layer, the UE may drop the corresponding MAC PDU.

In some implementations, a specific MAC CE(s) mentioned in the present disclosure may be one or more or any combination of a Configured Grant Confirmation MAC CE, a BFR report MAC CE, a BSR MAC CE, and a Power Headroom Report (PHR) MAC CE. In some implementations, the specific MAC CE may be a MAC CE that is configured with a specific mapping restriction(s). In some implementations, the specific MAC CE may be directed to a specific priority that is configured by the NW, or preconfigured/predefined/prestored in the UE without receiving signaling from the NW.

In some implementations, a specific LCH mentioned in the present disclosure may be an LCH that is configured with a specific mapping restriction(s). For example, the specific mapping restriction may restrict the MAC CE to be transmitted on an UL-resource with certain characteristics, e.g., with a specific Subcarrier Spacing index, a specific PUSCH transmission duration, and/or specific Cell information. In some implementations, the specific LCH may be an LCH that is configured with a specific priority value. For example, an LCH configured with a low priority value means that the LCH has a high priority. In this case, when there is an overlap between an UL resource (e.g., a PUCCH resource) for a BFR-SR transmission and an UL-SCH resource (e.g., a PUSCH resource), and the UL-SCH resource is used for the transmission of a MAC PDU that contains the data from the LCH with a low priority value (e.g., lower than the priority value for the BFR-SR transmission), the UE may only perform the transmission on the UL-SCH. The priority value may be configured by the NW in an LCH configuration (e.g., LogicalChannelConfig). In another example, the priority value may refer to an opposite situation, where an LCH configured with a low priority value means that the LCH has a low priority. In this case, when there is an overlap between an UL resource (e.g., a PUCCH resource) for a BFR-SR transmission and an UL-SCH resource (e.g., a PUSCH resource), and the UL-SCH resource is used for the transmission of a MAC PDU that contains the data from the LCH with a low priority value (e.g., lower than the priority value for the BFR-SR transmission), the UE may only perform the BFR-SR transmission.

In some implementations, the priority of a BFR-SR transmission may be up to the periodicity of the UL resource (e.g., a PUCCH resource) for the BFR-SR transmission. For example, if the BFR-SR transmission has a periodicity lower than a threshold, the priority of the BFR-SR transmission may be higher than the UL-SCH transmission.

In some implementations, if the UL resource (e.g., a PUCCH resource) for a BFR-SR transmission overlaps an UL-SCH resource, the UE may suspend the UL-SCH transmission during the BFR-SR transmission occasion in the time domain. In some implementations, the UE may resume the UL-SCH transmission after performing the BFR-SR transmission. In some implementations, the UE may resume the UL-SCH transmission when the resources (e.g., the UL resource for the BFR-SR transmission and the UL-SCH resource) are not overlapped with each other.

In some implementations, if the UL resource (e.g., a PUCCH resource) for a BFR-SR transmission overlaps an ongoing transmission on an UL-SCH resource, the UE may terminate the ongoing transmission on an UL-SCH resource. In addition, the UE may perform the BFR-SR transmission.

In some implementations, if the UL resource (e.g., a PUCCH resource) for a BFR-SR transmission overlaps an UL-SCH resource, the UE may skip the UL-SCH transmission during the BFR-SR transmission occasion in time domain. In addition, the UE may perform the BFR-SR transmission.

In some implementations, if a first UL resource for a BFR-SR transmission overlaps a second UL resource (e.g., a PUSCH), the UE may multiplex the information of the BFR-SR into the data which is transmitted on the second UL resource. For example, the UE may transmit the data including the BFR-SR on the second UL resource. For example, the UE may transmit the BFR-SR via the second UL resource.

In some implementations, the UL-SCH resource may be a dynamic resource scheduled by a PDCCH or DCI. In some implementations, the UL-SCH resource may be a configured UL resource (e.g., type 1/type 2 configured UL grant, Autonomous UL Transmission (AUL), etc.). The UL-SCH resource may be scheduled by an RAR.

In some implementations, if the UL resource (e.g., a PUCCH resource) for a BFR-SR transmission overlaps an UL-SCH resource scheduled by an RAR, the UE may only transmit the UL-SCH resource scheduled by the RAR (e.g., transmit the UL-SCH resource scheduled by the RAR without performing the BFR-SR transmission, where the BFR-SR transmission may be dropped/skipped by the UE). Specifically, because the transmission of an UL-SCH resource scheduled by an RAR is part of an RA procedure, and an RA procedure is usually triggered to respond to the impact on a Primary Cell (PCell), the UL-SCH resource scheduled by the RAR may be prioritized over the UL resource for a BFR-SR transmission in some implementations.

In some implementations, if a first PUCCH resource for a BFR-SR transmission collides with (or "overlaps") a second PUCCH resource (e.g., which is used for a specific UL Control Information (UCI) transmission, an (regular) SR transmission (e.g., for transmitting a regular SR), a Hybrid Automatic Repeat-reQuest (HARQ) feedback transmission, a Sounding Reference Signal (SRS) transmission, or a Channel State Information (CSI) report transmission, but not for a BFR-SR transmission) in the time domain, the UE may prioritize the first PUCCH resource for the BFR-SR transmission over the second PUCCH resource. Specifically, the priority of the first PUCCH resource for the BFR-SR transmission may be higher than the second PUCCH resource. In addition, the UE may perform transmissions based on the prioritization result. In some implementations, the UE may not transmit the second PUCCH on a time occasion that overlaps the first PUCCH resource (or the BFR-SR transmission occasion). In some implementations, the UE may only transmit the BFR-SR on the first PUCCH resource that overlaps with the second PUCCH resource. In this case, the UE may not perform the transmission on the second PUCCH resource. In some implementations, the UE may drop the transmission on the second PUCCH resource on the time occasion that overlaps the BFR-SR transmission occasion (e.g., the first PUCCH resource). In some implementations, the UE may suspend the transmission on the second PUCCH resource during the BFR-SR transmission occasion (e.g., the first PUCCH resource) in the time domain. In some implementations, the UE may resume the transmission on the second PUCCH resource after performing the BFR-SR transmission. In some implementations, the UE may drop the transmission on the second PUCCH resource if the suspension of the transmission on the second PUCCH resource results in a non-feasible time delay (e.g., require a long time to wait the next PUCCH resource). In some implementations, the UE may skip the transmission on the second PUCCH resource on the time occasion that overlaps the BFR-SR transmission occasion (e.g., the first PUCCH resource) In some implementations, the UE may multiplex the BFR-SR with the second PUCCH resource. For example, the UE may transmit the BFR-SR via the second PUCCH resource (e.g., which may be used for transmitting UCI, an SR, a HARQ feedback, an SRS, a CSI report, etc.).

In some implementations, if the UL resource (e.g., a first PUCCH resource) for a BFR-SR transmission overlaps an ongoing transmission on a second PUCCH resource, the UE may terminate the ongoing transmission on the second PUCCH resource.

In some implementations, whether the priority of a first PUCCH resource for a BFR-SR transmission is higher or lower than a second PUCCH resource (e.g., for a specific UCI transmission, an (regular) SR transmission, a HARQ feedback transmission, an SRS transmission, and/or a CSI report transmission, but not for a BFR-SR transmission) may be dependent upon a configuration from the NW. For example, the UE may be configured with a first priority for a BFR-SR transmission, and be configured with a second priority for an SR transmission. The first priority may be higher (or lower) than the second priority, depending on the content of the configuration.

In some implementations, whether the priority of a first PUCCH resource for a BFR-SR transmission is higher or lower than a second PUCCH resource (e.g., for a specific UCI transmission, an SR transmission, a HARQ feedback transmission, an SRS transmission, or a CSI report transmission, but not for a BFR-SR transmission) may be defined in the 3GPP technical specification(s).

In some implementations, whether the priority of a BFR-SR transmission is higher or lower than an (regular) SR transmission may dependent upon the characteristic or configuration of the BFR-SR and the SR. In one implementation, the priority may be based on the periodicity of the resource for transmitting the BFR-SR and the periodicity of the resource for transmitting the SR. For example, as the periodicity is shorter, the priority becomes higher. In one implementation, the priority may be based on the index of the BFR-SR configuration and the index of the SR configuration. For example, the configuration associated with a lower index value may have a higher priority.

In some implementations, if the UL resource (e.g., a PUCCH resource) for a BFR-SR transmission overlaps an (regular) SR transmission occasion, whether to transmit the BFR-SR or the SR may be dependent upon the priority of the LCH that triggers the SR. For example, if the SR transmission is triggered by an LCH with a high priority (e.g., the priority parameter configured for the LCH is lower than a threshold or has a specific priority value), the UE may prioritize the SR transmission over the BFR-SR transmission. If the SR transmission is triggered by an LCH with a low priority (e.g., the priority parameter configured for the LCH is higher than a threshold or has a specific priority value), the UE may prioritize the BFR-SR transmission over the SR transmission. In another example, if the SR transmission is on a PUCCH resource that belongs to a cell where the beam failure event is detected (e.g., a cell on which a BFR-SR procedure is triggered), and also an UL resource for the SR transmission overlaps the UL resource for a BFR-SR transmission, the UE may prioritize the BFR-SR transmission over the SR transmission. In some implementations, the priority may be configured by the NW in an LCH configuration (e.g., LogicalChannelConfig). In some implementations, an SR configuration may consist of a set of PUCCH resources for SR across different BWPs and cells. For an LCH or for (SCell) BFR. In some implementations, at most one PUCCH resource for SR is configured per BWP.

In some implementations, the BSR procedure is used to provide the BS with information about UL data volume in the MAC entity. In some implementations, the BSR MAC CE may indicate the amount of data that is buffered for a Logical Channel Group (LCG) in the UE. In some implementations, a field of the BSR MAC CE (e.g., Buffer Size) may indicate the total amount of available data across all LCHs of an LCG after the MAC PDU has been built. It is noted that when a BSR procedure is triggered (e.g. when new data arrives at the transmission buffers of the UE), a regular SR procedure may be triggered and an (regular) SR may be transmitted by the UE when no UL resources are available to transmit the BSR.

In some implementations, each SR configuration corresponds to one or more LCHs or to (SCell) BFR procedure. Each LCH may be mapped to zero or one SR configuration, which may be configured by RRC. The SR configuration of the LCH that triggered a BSR procedure or the (SCell) BFR procedure is considered as corresponding SR configuration for the triggered SR procedure.

In some implementations, the SR configuration of the LCH that triggers a BSR procedure, e.g., a regular BSR procedure, may be considered as the SR configuration for the triggered BSR procedure. On the other hand, for a BSR procedure triggered by the expiry of a BSR retransmission timer (e.g., retxBSR-Timer), the UE may consider that the LCH that triggers the BSR procedure is the highest priority LCH that has the data available for transmission at the time the BSR procedure is triggered. Thus, the SR configuration for the triggered BSR procedure may correspond to an SR procedure that is triggered by a BSR procedure triggered by the highest priority LCH. Moreover, if the LCH does not map to any SR configuration, the UE may initiate an RA procedure to request an UL resource.

In some implementations, if a BFR-SR transmission is prioritized over an (regular) SR transmission (e.g., determined in the MAC entity of the UE), the MAC entity of the UE may not instruct the PHY layer of the UE to transmit an (regular) SR on a valid PUCCH resource for the SR transmission. Instead, the MAC entity of the UE may instruct the PHY of the UE to transmit the BFR-SR on a valid PUCCH resource for the BFR-SR transmission.

For a PRACH transmission, an RA procedure may be triggered by several events (e.g., an initial access from the RRC_IDLE state, an RRC Connection Re-establishment procedure, the DL/UL data arrival during the RRC_CONNECTED state when the UL synchronization status is "non-synchronized", the UL data arrival during the RRC_CONNECTED state when there is no PUCCH resource available for an SR transmission, an SR failure, a Request by the RRC of the UE upon a synchronous reconfiguration (e.g. handover), a transition from the RRC_INACTIVE state, to establish time alignment at the SCell addition, a Request for Other System Information (OSI), and/or a BFR procedure). In some implementations, since some events may be triggered to respond to the impact on a PCell (e.g., an RRC connection re-establishment, a handover, a BFR procedure, etc.), these events may be more important than performing a BFR procedure on an SCell(s). In this case, if a BFR-SR transmission occasion collides with (e.g., overlaps) a PRACH transmission occasion, the UE may prioritize the PRACH transmission.

In some implementations, if the UL resource for a BFR-SR transmission collides with a valid PRACH occasion (e.g., during an ongoing RA procedure) in the time domain, the UE may prioritize the PRACH transmission over the BFR-SR transmission.

In some implementations, the priority of the PRACH resource may be higher than the UL resource for a BFR-SR transmission.

In some implementations, the UE may not transmit the BFR-SR on the time occasion which overlaps the valid PRACH occasion (during an ongoing RA procedure).

In some implementations, the UE may only perform the PRACH transmission (during an ongoing RA procedure) on the time occasion which overlaps the UL resource for a BFR-SR transmission. The UE may not perform the BFR-SR transmission during the overlapped time occasion.

In some implementations, the UE may suspend/skip/ignore/stop transmitting a BFR-SR on the time occasion which overlaps the valid PRACH occasion (during an ongoing RA procedure).

In some implementations, a UE may determine whether to prioritize the PRACH transmission (during an ongoing RA procedure) over the BFR-SR transmission based on an RA triggering event. For example, if an RA procedure is triggered by a first RA event (e.g., a handover or a BFR procedure), the UE may prioritize the PRACH transmission over the BFR-SR transmission. If the RA procedure is triggered by a second RA event (e.g., a System Information (SI) request), the UE may not prioritize the PRACH transmission (during an ongoing RA procedure) over the BFR-SR transmission. In this case, the BFR-SR transmission may have a higher priority over the PRACH transmission. In some implementations, the first RA event may be one of the following RA triggering events: an initial access from the RRC_IDLE state, an RRC Connection Re-establishment procedure, DL/UL data arrival during the RRC_CONNECTED state when the UL synchronization status is "non-synchronized", UL data arrival (e.g., data from the higher layer(s) (e.g., the RRC layer, the Packet Data Convergence Protocol (PDCP) layer, and/or the Radio Link Control (RLC) layer) arrives at the UE's MAC entity) during the RRC_CONNECTED state when there is no PUCCH resources available for an SR transmission, an SR transmission failure (e.g., the number of SR transmission exceeds a configured maximum number), a Request by RRC upon synchronous reconfiguration (e.g. a handover), a Transition from the RRC_INACTIVE state, to establish a time alignment at an SCell addition, a Request for OSI, and/or a BFR procedure.

In some implementations, the second RA event may be one of the following RA triggering events: an initial access from the RRC_IDLE state, an RRC Connection Re-establishment procedure, DL/UL data arrival during the RRC_CONNECTED state when the UL synchronization status is "non-synchronized", UL data arrival during the RRC_CONNECTED state when there is no PUCCH resources available for an SR configuration, an SR transmission failure (e.g., the number of SR transmission exceeds a configured maximum number), a Request by RRC upon synchronous reconfiguration (e.g. a handover), a Transition from RRC_INACTIVE, to establish a time alignment at an SCell addition, a Request for OSI, and a BFR procedure.

In some implementations, the first and/or the second RA event may be one of the following RA events:
Initial access from RRC_IDLE;
RRC Connection Re-establishment procedure;
DL or UL data arrival during RRC_CONNECTED when UL synchronization status is "non-synchronized";
UL data arrival during RRC_CONNECTED when there are no PUCCH resources for SR available;
SR failure;
Request by RRC upon synchronous reconfiguration (e.g. handover);
Transition from RRC_INACTIVE;
To establish time alignment for a secondary Timing Alignment Group (TAG);
Request for Other SI;
Beam failure recovery;
Consistent UL Listen Before Talk (LBT) failure on SpCell.

In some implementations, an RA procedure may be triggered when there is no PUCCH resource for an SR configuration which has pending SR, and the SR is triggered by a specific priority LCH. For example, the specific priority LCH may be an LCH configured with a specific priority value or a specific mapping restriction (e.g. the allowedSCS-List, the maxPUSCH-Duration, the configuredGrantType1Allowed, the allowedServingCells, etc.) or other parameter(s) configured per LCH.

In some implementations, the first and/or the second RA event may be one of the following RA events:
Initial access from RRC_IDLE;
RRC Connection Re-establishment procedure;
DL or UL data arrival during RRC_CONNECTED when UL synchronization status is "non-synchronized";
UL data arrival during RRC_CONNECTED when there are no PUCCH resources for SR available;

SR failure;

Request by RRC upon synchronous reconfiguration (e.g. handover);

Transition from RRC_INACTIVE;

To establish time alignment for a secondary TAG;

Request for OSI;

Beam failure recovery;

Consistent UL LBT failure on SpCell.

In some implementations, an RA procedure may be triggered due to UL data arrival during RRC_CONNECTED, where the RA procedure may be triggered when there is no PUCCH resource for a specific SR configuration which has pending SR. The specific SR configuration may be a configuration with a specific SR identification (ID) (e.g., schedulingRequestId), an SR resource ID (e.g., schedulingRequestResourceId) or any other parameter (e.g., periodicity) that is configured per SR configuration.

In some implementations, two types of random access procedure may be supported: 4-step RA type with MSG1 and 2-step RA type with MSGA. Both types of RA procedure support contention-based random access (CBRA) and contention-free random access (CFRA).

In some implementations, the UE may select the type of random access at initiation of the random access procedure based on network configuration:

when CFRA resources are not configured, an RSRP threshold is used by the UE to select between 2-step RA type (or procedure) and 4-step RA type (or procedure);

when CFRA resources for 4-step RA type are configured, UE performs random access with 4-step RA type;

when CFRA resources for 2-step RA type are configured, UE performs random access with 2-step RA type.

In some implementations, the Message A (MSGA) of the 2-step RA type includes a preamble on PRACH and a payload on PUSCH. After MSGA transmission, the UE monitors for a response from the network within a configured window. For CFRA, upon receiving the network response, the UE ends the random access procedure. For CBRA, if contention resolution is successful upon receiving the network response, the UE ends the random access procedure; while if fallback indication is received in Message B (MSGB), the UE performs MSG3 transmission and monitors contention resolution. If contention resolution is not successful after MSG3 (re)transmission(s), the UE goes back to MSGA transmission.

In some implementations, the UE may determine whether to prioritize the PRACH transmission (during an ongoing RA procedure) over the BFR-SR transmission based on which cell the RA procedure is initiated on. For example, if the RA procedure is initiated on an SpCell, the priority of the BFR-SR transmission may be lower than the PRACH transmission for this RA procedure. For example, if the RA procedure is initiated on an SCell, the priority of the BFR-SR transmission may be higher than the PRACH transmission for this RA procedure. For example, if the RA procedure is initiated on a cell that initiates a BFR procedure, the priority of the BFR-SR transmission may be higher than the PRACH transmission in the RA procedure.

In some implementations, a UE may be configured with a measurement gap on a serving cell (e.g., via a measurement gap configuration (measGapConfig)). During the measurement gap on the serving cell, since the UE may need to perform measurements during this period of time (measurement gap), the UE may not perform certain DL receptions (e.g., a PDCCH monitoring, a DL-SCH reception) and/or certain UL transmissions (e.g., a HARQ feedback transmission, an SR transmission, a CSI transmission, an SRS report transmission, an UL-SCH transmission). In this situation, the UE determine whether to perform a BFR-SR transmission during the measurement gap based on the priority between the BFR-SR transmission and the measurement (to be performed in the measurement gap).

In some implementations, whether a measurement is non-gap-assisted or gap-assisted may be dependent upon the capability of the UE, the active BWP of the UE, and the current operating frequency.

For example, for an SSB based inter-frequency, a measurement gap configuration may be provided in the following cases (a1) and (a2):

(a1) if the UE only supports per-UE measurement gaps; and (a2) if the UE supports per-Frequency Range (FR) measurement gaps and any of the configured BWP frequencies of any of the serving cells are in the same FR of the measurement object.

For example, for an SSB based intra-frequency measurement, a measurement gap configuration may be provided in the following case (b1):

(b1) other than the initial BWP, if any of the UE-configured BWP does not contain the frequency domain resources of the SSB associated to the initial DL BWP.

In some implementations, in the non-gap-assisted scenarios, the UE may be able to carry out such measurements without the measurement gaps. In the gap-assisted scenarios, the UE may not be able to carry out such measurements without the measurement gaps.

In some implementations, during a measurement gap, the UE may not perform a BFR-SR transmission on the serving cell(s) in the corresponding FR of the measurement gap configured by the measGapConfig. In some implementations, the UE may only perform a BFR-SR transmission if the UL resource for the BFR-SR transmission occasion does not overlap with the measurement gap.

In some implementations, if at least one of the following conditions (d1)-(d6) is satisfied, the UE may monitor the PDCCH on the serving cell(s) in the corresponding FR of the measurement gap configured by the measGapConfig:

(d1) if a BFR-SR procedure is pending;

(d2) if a BFR-SR timer is running;

(d3) if the value of a BFR-SR counter is not zero;

(d4) if a beam failure event is detected on a cell(s) (e.g., a PCell, a PSCell, an SCell);

(d5) if a BFR procedure for an SpCell or an SCell is ongoing; and (d6) if a BFR-SR has been transmitted (or sent on a PUCCH).

In some implementations, the UE may be configured with an RRC configuration with a Discontinuous Reception (DRX) function that controls the PDCCH monitoring behaviour of the UE. When the UE is in the RRC_CONNECTED state, if the DRX function is configured, for all the activated Serving Cells, the UE may monitor the PDCCH discontinuously using the DRX operation (e.g., provided in the 3GPP TS 38.321). Otherwise, the UE may monitor the PDCCH.

In some implementations, when a UE is configured with the DRX function, the UE may need to monitor a PDCCH in the Active Time. For example, at least one of the following conditions (e1)-(e6) may be included in the Active Time.

(e1) if a BFR-SR has been transmitted (or sent on a PUCCH);

(e2) if a BFR-SR procedure is pending;

(e3) if a BFR-SR timer is running;

(e4) if the value of a BFR-SR counter is not zero;

(e5) if a beam failure event is detected on a cell(s) (e.g., a PCell, a PSCell, an SCell); and (e6) if a BFR procedure for an SpCell or an SCell is ongoing.

An example TP is in Table 2.

TABLE 2

Example

When a DRX cycle is configured, the Active Time includes the time while:
drx-onDurationTimer or drx-InactivityTimer or drx-RetransmissionTimerDL or drx-RetransmissionTimerUL or ra-ContentionResolutionTimer (as described in subclause 5.1.5) is running; or
an SR is sent on PUCCH and is pending (as described in subclause 5.4.4); or
a BFR-SR is sent on PUCCH and is pending; or
a PDCCH indicating a new transmission addressed to the C-RNTI of the MAC entity has not been received after successful reception of an RAR for the Random Access Preamble not selected by the MAC entity among the contention-based Random Access Preamble (as described in subclause 5.1.4).

In some implementations, the BFR-SR timer may be used to control the BFR-SR transmission. For example, when the BFR-SR timer is running, the UE may transmit the BFR-SR on a valid PUCCH resource for the BFR-SR transmission. When the BFR-SR timer is not running, the UE may not transmit the BFR-SR (even if the corresponding BFR-SR procedure is pending on the UE). In some implementations, when the BFR-SR timer is running, the corresponding BFR-SR procedure may be considered as pending. In some implementations, the BFR-SR timer may be configured by an RRC configuration from the NW. For example, the BFR-SR timer may be included in a BFR-SR configuration (e.g., a configuration of a BFR-SR procedure) or a configuration for BFR of the SCell(s). In some implementations, the unit of a BFR-SR timer may be a millisecond, a slot, a symbol, the periodicity of a BFR-SR transmission, or the periodicity of the resource for a BFR-SR transmission.

In some implementations, when the BFR-SR procedure is triggered, the BFR-SR procedure may be considered as "pending" until it is cancelled.

In some implementations, the BFR-SR counter may be used to control the BFR-SR transmission. For example, the UE may use the BFR-SR counter to count how many times a BFR-SR has been transmitted. For example, the NW may configure the UE with a maximum number for the BFR-SR counter. When the UE transmits a BFR-SR, the UE may increase the value of the BFR-SR counter by 1.

Overlap of BFR Procedures

In some implementations, a UE may use an RA procedure for SpCell BFR to recover from a beam failure event detected on an SpCell, and use an SCell BFR procedure to recover from a beam failure event detected on an SCell(s). In certain cases, the RA procedure for SpCell BFR and the SCell BFR procedure for the SCell(s) may be performed by the UE individually. In addition, the beam failure event on the SpCell and the beam failure event on the SCell(s) may happen simultaneously (e.g., happen in the same symbol/slot/subframe/frame). In this case, for example, the RA procedure for SpCell BFR and the SCell BFR procedure may be initiated/triggered by the UE at the same time (e.g., in the same symbol/slot/subframe/frame). In another example, the UE may initiate/trigger the RA procedure for SpCell BFR, and then initiate/trigger the SCell BFR procedure when the RA procedure for SpCell BFR is ongoing. In another example, the UE may initiate/trigger the SCell BFR procedure, and then initiate/trigger the RA procedure for SpCell BFR when the SCell BFR procedure is ongoing. Based on the examples described above, the UE may need to determine whether to initiate/perform multiple BFR procedures simultaneously, and/or determine the priority of different BFR procedures.

Beam Failure Event on SpCell and Beam Failure Event on SCell are Detected at the Same Time During the SCell BFR procedure, if a BFR-SR procedure is pending, the UE may transmit a BFR-SR on a valid PUCCH resource for the BFR-SR transmission. In some implementations, the PUCCH resource for the BFR-SR transmission may be configured only on the SpCell, and not be configured on the SCell(s). When a beam failure event is detected on the SpCell (e.g., based on the RA procedure for SpCell BFR), the channel quality to the SpCell may not be good enough for the DL and/or UL transmission(s). Therefore, the UE may prioritize the RA procedure for SpCell BFR.

In some implementations, if a beam failure event on the SpCell and a beam failure event on the SCell are detected at the same time, the UE may prioritize the RA procedure for SpCell BFR for the beam failure event on the SpCell.

In some implementations, the UE may only initiate the RA procedure for SpCell BFR for the beam failure event on the SpCell if the beam failure event on the SpCell and the beam failure event on the SCell are detected at the same time. For example, the UE may not initiate an SCell BFR procedure for the beam failure event on the SCell. For example, the UE may cancel the SCell BFR procedure if the beam failure event on the SpCell and the beam failure event on the SCell are detected at the same time. For example, the UE may reset the timer and/or counter used in the BFD operation of the SCell BFR procedure.

In some implementations, the UE may initiate the RA procedure for SpCell BFR if the beam failure event on the SpCell and the beam failure event on the SCell are detected at the same time. In addition, the UE inform the NW of the beam failure information (e.g., indicating the beam failure event on the SCell) via the RA procedure for SpCell BFR. For example, the UE may transmit a BFRQ MAC CE via an UL grant provided by an RAR or via an UL grant provided by the RAR/BFR response of the RA procedure for SpCell BFR. In some implementations, the UE may only initiate the RA procedure for SpCell BFR if the beam failure event on the SpCell and the beam failure event on the SCell are detected at the same time. In this case, the PUCCH-based BFR may be suspended until the SpCell is recovered from the beam failure event. In some implementations, the PUCCH-based BFR may be cancelled.

In some implementations, the UE may suspend the initiation of the SCell BFR procedure if the beam failure event on the SpCell and the beam failure event on the SCell are detected at the same time. The UE may resume the initiation of SCell BFR procedure when the RA procedure for SpCell BFR is completed.

In some implementations, the UE may initiate the SCell BFR procedure after the RA procedure for SpCell BFR is completed if the beam failure event on the SpCell and the beam failure event on the SCell are detected at the same time.

In some implementations, the UE may initiate both the RA procedure for SpCell BFR and the SCell BFR procedure if the beam failure event on the SpCell and the beam failure event on the SCell are detected at the same time. The UE may transmit a BFR report (e.g., including a BFR MAC CE and the sub-header of the BFR MAC CE) via the UL grant from RAR. In some implementations, the UE may not transmit any BFR-SR during the SCell BFR procedure.

In some implementations, detecting a beam failure event on the SpCell and a beam failure event on the SCell at the same time may refer to the case of a first Beam Failure Indication (BFI) counter (e.g., configured on the SpCell) used in the RA procedure for SpCell BFR reaching a first maximum number and, at the same time (e.g., in the same symbol/slot/subframe/frame), a second BFI counter (e.g., configured on an SCell/a group of SCells) used in the SCell BFR procedure reaching a second maximum number.

Figure 2:
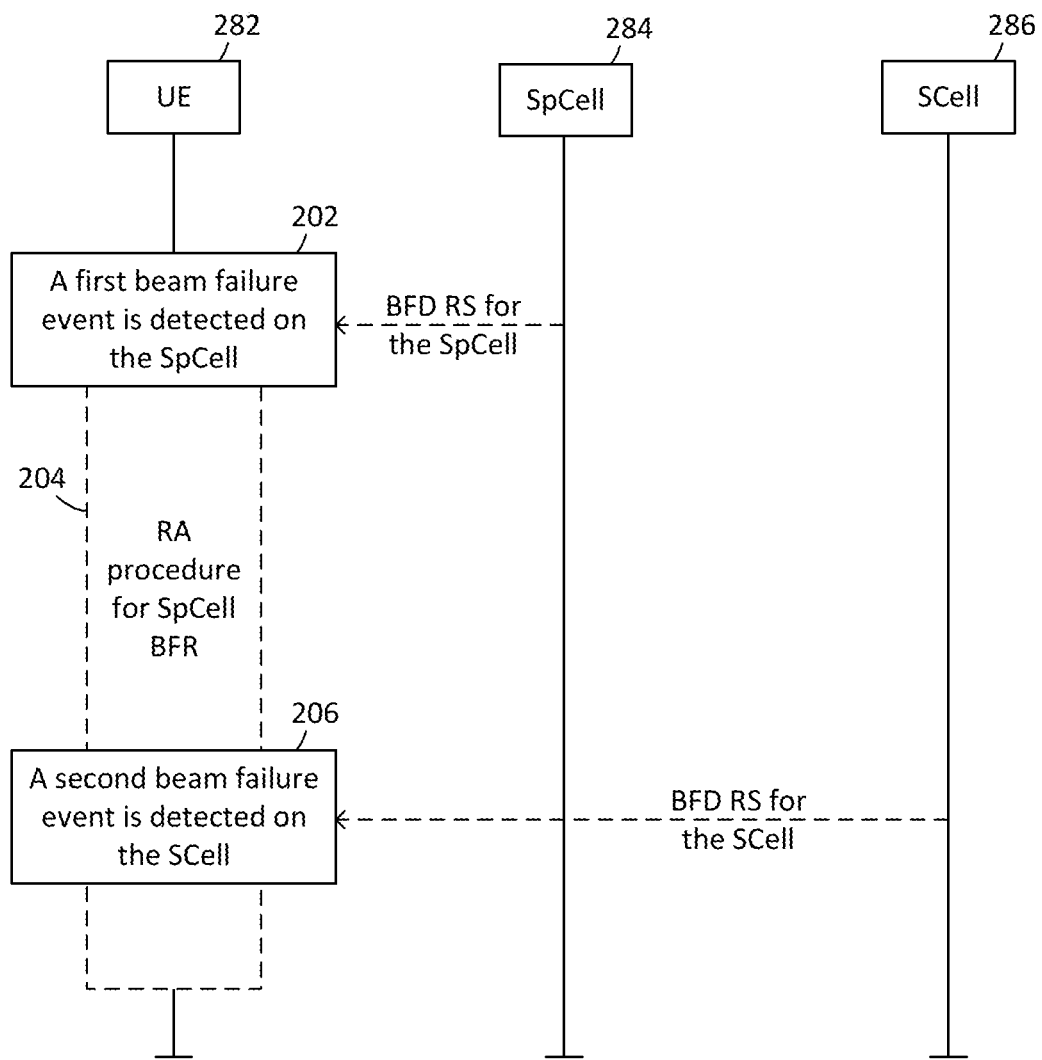
FIG. 2 illustrates a signaling procedure during which a beam failure event is detected when a Random Access (RA) procedure for a Special Cell (SpCell) BFR is ongoing, in accordance with an implementation of the present disclosure.

Beam Failure Event on SpCell is Detected, and Beam Failure Event on SCell is Detected when RA Procedure for SpCell BFR for the Beam Failure Event on SpCell is Ongoing FIG. 2 illustrates a signaling procedure during which a beam failure event is detected when an RA procedure for SpCell BFR is ongoing, in accordance with an implementation of the present disclosure.

In action 202, the UE 282 may detect a first beam failure event on the SpCell 284 based on the BFD RS(s) for the SpCell 284. The first beam failure event may be a beam failure event on the SpCell.

In action 204, in response to detecting the first beam failure event on the SpCell 284, the UE 282 may initiate/trigger an RA procedure for SpCell BFR to attempt to recover from the first beam failure event. For example, the UE 282 may perform a 2-step/4-step RA procedure during the RA procedure for SpCell BFR. In the 2-step RA procedure, the messages may be identified as msgA (e.g., an RA preamble and a PUSCH payload) and msgB (e.g., an RAR). In the 4-step RACH procedure, the messages may be identified as msg1 (e.g., an RA preamble), msg2 (e.g., an RAR), msg3 (e.g., an RRC connection request) and msg4 (e.g., an RRC contention setup/resolution message).

Upon completion of the RA procedure (e.g., upon reception of the msgB or the msg4), the RA procedure for SpCell BFR may be considered completed. In addition, when the RA procedure for SpCell BFR is initiated, the RA procedure for SpCell BFR may be considered ongoing until the RA procedure for SpCell BFR is stopped/cancelled or is considered completed.

In action 206, the UE 282 may detect a second beam failure event on the SCell 286 based on the BFD RS(s) for the SCell 286 when the RA procedure for SpCell BFR is ongoing. The second beam failure event may be a beam failure event on the SCell.

In response to detecting the second beam failure event on the SCell 286 when the RA procedure for SpCell BFR is ongoing, the UE may not initiate an SCell BFR procedure for the second beam failure event. For example, the UE may continue to perform the ongoing RA procedure for SpCell BFR (without interruption by the SCell BFR procedure). For example, the UE may cancel the SCell BFR procedure. For example, the UE may reset the corresponding timer and/or counter may be used in the BFR operation of the SCell BFR procedure.

In some implementations, in response to detecting the second beam failure event on the SCell 286 when the RA procedure for SpCell BFR is ongoing, the UE may suspend the ongoing SCell BFR procedure (if exists), or initiate an SCell BFR procedure after the RA procedure for SpCell BFR is completed.

In some implementations, in response to detecting the second beam failure event on the SCell 286 when the RA procedure for SpCell BFR is ongoing, the UE may initiate an SCell BFR procedure for the second beam failure event and transmit a BFR report via an grant provide by an RAR.

In some implementations, in response to detecting the second beam failure event on the SCell 286 when the RA procedure for SpCell BFR is ongoing, the UE may initiate the SCell BFR procedure for the second beam failure event and transmit a BFR report via an UL grant provided by the msg4 (of a 4-step RA procedure) or the msgB (of a 2-step RA procedure).

In some implementations, the UE may not transmit a BFR-SR during the SCell BFR procedure. In some implementations, the UE may not transmit a BFR-SR when an RA procedure is ongoing.

In some implementations, the UE may not transmit a BFR-SR when an RA procedure for SpCell BFR is ongoing.

Figure 3:
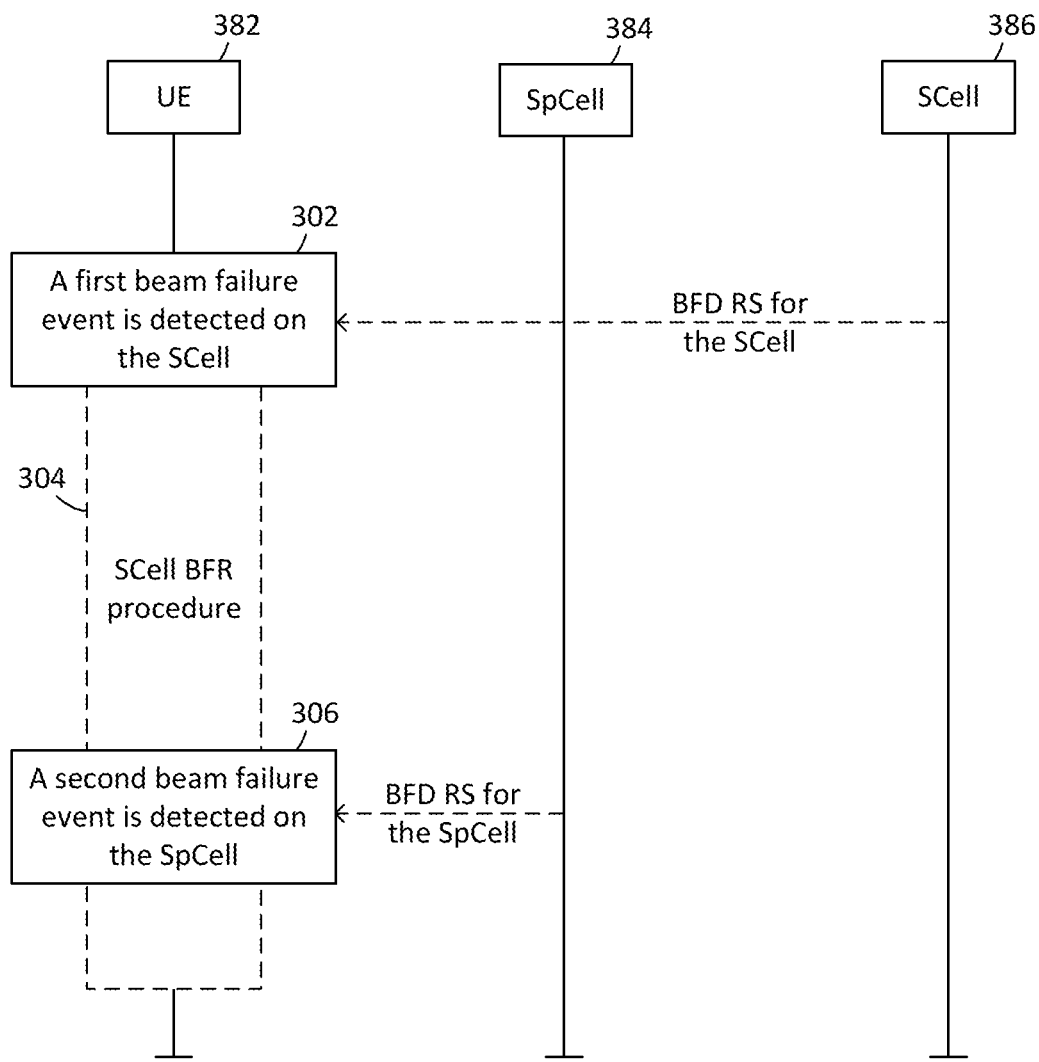
FIG. 3 illustrates a signaling procedure during which a beam failure event is detected when a Secondary Cell (SCell) BFR procedure is ongoing, in accordance with an implementation of the present disclosure.

Beam Failure Event on SCell is Detected, and Beam Failure Event on SpCell is Detected when SCell BFR Procedure for the Beam Failure Event on SCell is Ongoing FIG. 3 illustrates a signaling procedure during which a beam failure event is detected when an SCell BFR procedure is ongoing, in accordance with an implementation of the present disclosure.

In action 302, the UE 382 may detect a first beam failure event on the SCell 386 based on the BFD RS(s) for the SCell 386. The first beam failure event may be a beam failure event on the SCell.

In action 304, in response to detecting the first beam failure event on the SCell 386, the UE 382 may initiate/trigger an SCell BFR procedure to attempt to recover from the first beam failure event. When the SCell BFR procedure is triggered, the SCell BFR procedure is considered ongoing or pending until the SCell BFR procedure is stopped/cancelled or is considered completed.

In some implementations, the SCell BFR procedure may include at least one of a BFD operation (e.g., action 102 illustrated in FIG. 1) for an SCell, an NBI operation (e.g., action 104 illustrated in FIG. 1) for the SCell, a BFRQ operation (e.g., action 106 illustrated in FIG. 1) for the SCell, and a BFR operation (e.g., action 108 illustrated in FIG. 1) for the SCell.

In action 306, the UE 382 may detect a second beam failure event on the SpCell 384 based on the BFD RS(s) for the SpCell 384 when the SCell BFR procedure is ongoing. The second beam failure event may be a beam failure event on the SpCell.

In some implementations, in response to detecting the second beam failure event on the SpCell 384 when the SCell BFR procedure is ongoing, the UE may initiate an RA procedure for SpCell BFR for the second beam failure event and prioritize the RA procedure for SpCell BFR over the SCell BFR procedure. For example, the UE may stop/cancel the SCell BFR procedure and/or initiate the RA procedure for SpCell BFR. For example, the UE may reset the corresponding timer and/or counter which may be used in the BFD operation of the SCell BFR procedure.

In some implementations, in response to detecting the second beam failure event on the SpCell 384 when the SCell BFR procedure is ongoing, the UE may initiate an RA procedure for SpCell BFR for the second beam failure event. In addition, the UE may suspend the SCell BFR procedure. The UE may resume the SCell BFR procedure after the RA procedure for SpCell BFR is completed.

In some implementations, in response to detecting the second beam failure event on the SpCell 384 when the SCell BFR procedure is ongoing, the UE may initiate an RA procedure for SpCell BFR for the second beam failure event, and transmit a BFR report (generated by the SCell BFR procedure) via an UL grant provided by an RAR. In some implementations, the UE may not transmit a BFR-SR during the RA procedure for SpCell BFR.

In some implementations, in response to detecting the second beam failure event on the SpCell 384 when the SCell BFR procedure is ongoing, the UE may initiate an RA procedure for SpCell BFR and transmit a BFR report (generated by the SCell BFR procedure) via an UL grant provided by the Msg3 and/or msg4 of the RA procedure for SpCell BFR (e.g., triggered during SCell BFR procedure).

In some implementations, the UE may not transmit a BFR-SR during the SCell BFR procedure if the RA procedure for SpCell BFR is ongoing. In some implementations, the UE may not transmit a BFR-SR when an RA procedure is ongoing.

In some implementations, the UE may not transmit a BFR-SR when an RA procedure for SpCell BFR is ongoing.

In some implementations, the NW may configure different sets of BFD-RSs for different SCell(s). For example, each set of the BFD-RSs may be associated with an SCell or a set/group of SCells. The UE may detect a beam failure event per set of BFD-RSs. For example, the UE may be configured with a first set of BFD-RSs that is associated with a first SCell(s), and the UE may be configured with a second set of BFR-RSs that is associated with a second SCell(s). The UE may perform a first BFD for the first SCell(s) based on the first set of BFD-RSs, and perform a second BFD of the second SCell(s) based on the second set of BFD-RSs. Since each BFD operation of an SCell BFR procedure may be performed independently, more than one beam failure event on the SCell may be detected at the same time (e.g., in the same symbol/slot/subframe/frame). In this sense, the UE may need to determine whether to trigger/perform multiple SCell BFR procedures simultaneously, and/or determine the priority of different SCell BFR procedures.

First Beam Failure Event on SCell and Second Beam Failure Event on SCell are Detected at the Same Time In some implementations, if a first beam failure event on the SCell for a first SCell(s) and a second beam failure event on the SCell for a second SCell(s) are detected at the same time (e.g., detected in the same symbol/slot/subframe/frame), the UE may initiate only one SCell BFR procedure in response to the detection of the first beam failure event on the SCell and the second beam failure event on the SCell.

In some implementations, each MAC entity of a UE may be configured with only one BFR-SR configuration that includes configuration parameter(s) for a BFR-SR procedure. The UE may perform a BFR-SR procedure based on the BFR-SR configuration.

In some implementations, the UE may be configured with only one PUCCH resource configuration for a BFR-SR transmission per BFR-SR configuration.

In some implementations, the UE may generate a BFR report (e.g., including a BFR MAC CE and the sub-header of the BFR MAC CE) to report the beam failure information of the first SCell(s) and the second SCell(s).

For example, when the UE detects a first beam failure event on a first SCell(s) and a second beam failure event on a second SCell(s) at the same time, the UE may initiate only one SCell BFR procedure in response to detecting the first and second beam failure events. For example, the UE may trigger only one BFR-SR procedure. The UE may generate a BFR report which includes the beam failure information of the first SCell(s) and the second SCell(s) and the corresponding candidate beam information (or new beam information) for the first and second SCell(s).

In some implementations, if a first beam failure event on the SCell and a second beam failure event on the SCell are detected at the same time, the UE may initiate a first SCell BFR procedure for the first beam failure event on the SCell and initiate a second SCell BFR procedure for the second beam failure event on the SCell.

In some implementations, each MAC entity of a UE may be configured multiple BFR-SR configurations.

In some implementations, the UE may be configured with only one PUCCH resource configuration for a BFR-SR transmission per MAC entity of a UE. For example, multiple-BFR SR configurations may share a common PUCCH resource configuration for a BFR-SR transmission. In some implementations, there may be only one BFR-SR procedure pending on the UE at a point of time (e.g., no matter how many SCell BFR procedures are initiated or ongoing). In some implementations, the UE may generate a first BFR report (e.g., including a first BFR MAC CE) to report the beam failure information of the first SCell(s), and generate a second BFR report (e.g., including a second BFR MAC CE) to report the beam failure information of the second SCell(s). In some implementations, the UE may utilize the same UL resource to transmit the first BFR report and the second BFR report.

In some implementations, when the UE detects a first beam failure event on a first SCell(s) and detects a second beam failure event on a second SCell(s) at the same time, the UE may initiate a first SCell BFR procedure and initiate a second SCell BFR procedure. In response to the first SCell BFR procedure and the second SCell BFR procedure, the UE may initiate only one BFR-SR procedure. For example, the UE may generate a first BFR report (e.g., a first BFR MAC CE plus the sub-header of the first BFR MAC CE) that includes the beam failure information of the first SCell(s) and the corresponding candidate beam information (or new beam information) for the first SCell(s), and generate a second BFR report (e.g., a second BFR MAC CE plus the sub-header of the second BFR MAC CE) that includes the beam failure information of the second SCell(s) and the corresponding candidate beam information (or new beam information) for the second SCell(s).

In some implementations, a BFR MAC CE may indicate all the serving cell(s) that initiates an SCell BFR procedure prior to the assembly of the MAC PDU that includes this BFR MAC CE.

In some implementations, detecting a first beam failure event on a first SCell(s) and detecting a second beam failure event on a second SCell(s) at the same time may refer to the case of a first BFI counter used in the first SCell BFR procedure reaching a first maximum number, and at the same time (e.g., in the same symbol/slot/subframe/frame), a second BFI counter used in the second SCell BFR procedure reaching a second maximum number. The first maximum number and the second maximum number may be configured by the NW or prestored in the UE.

In some implementations, when the UE detects a first beam failure event on a first SCell(s) and detects a second beam failure event on a second SCell(s) at the same time, the UE may prioritize one of a first SCell BFR procedure for the first beam failure event and a second SCell BFR procedure for the second beam failure event over the other.

In some implementations, each SCell BFR procedure (e.g., the first SCell BFR procedure and the second SCell BFR procedure) may be configured with a priority (value/index) by the NW. The UE may determine which SCell BFR procedure has a higher priority based on the priority of the respective SCell BFR procedures.

In some implementations, the UE may determine whether an SCell BFR procedure has a higher priority than another SCell BFR procedure based on the SCell(s) associated with the BFD RSs used in the BFD operation of the SCell BFR procedure.

In some implementations, the UE may determine whether an SCell BFR procedure has a higher priority than another SCell BFR procedure based on the serving cell(s) on which the beam failure event is detected.

Figure 4:
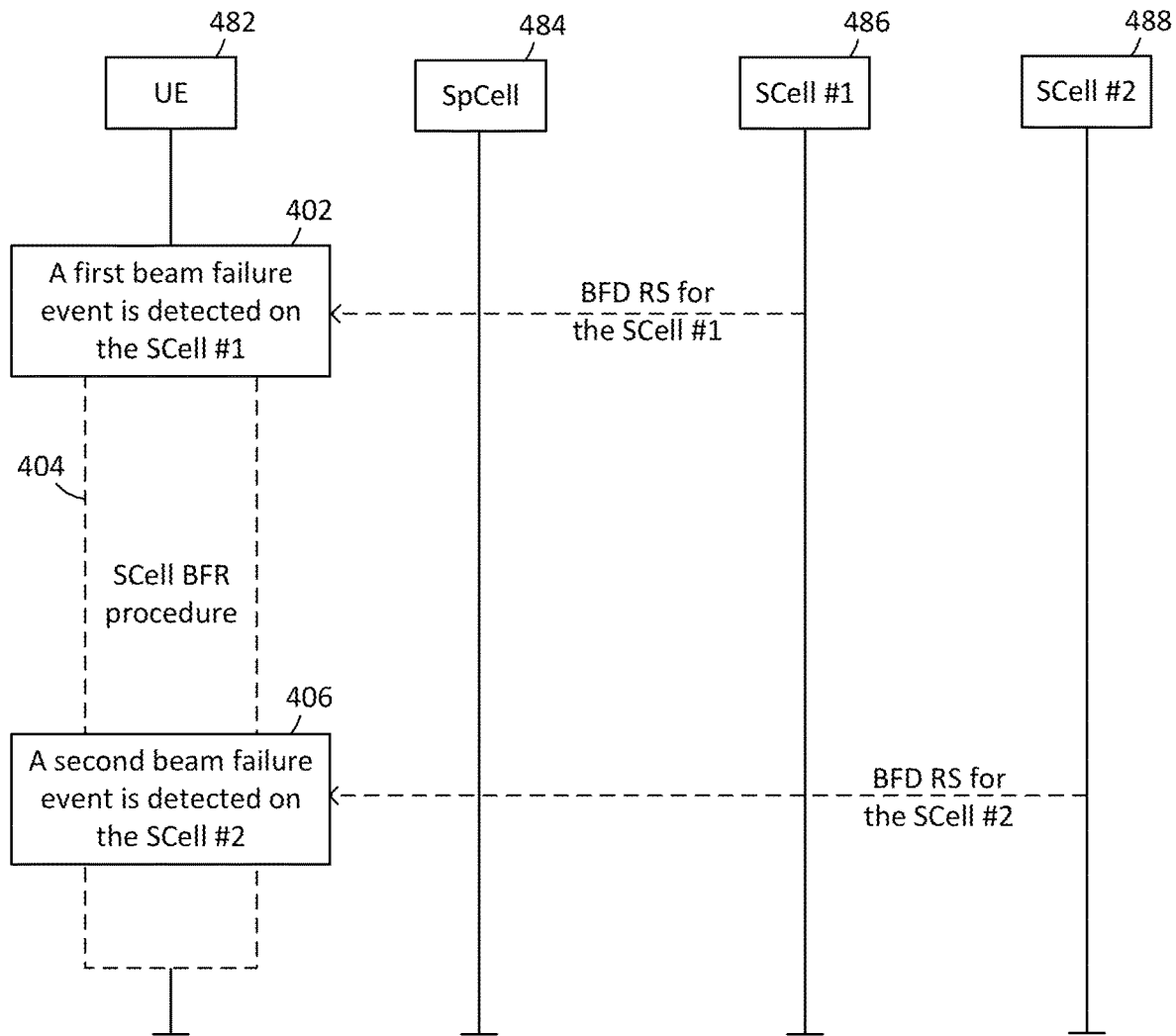
FIG. 4 illustrates a signaling procedure during which a beam failure event is detected when an SCell BFR procedure is ongoing, in accordance with an implementation of the present disclosure.

First Beam Failure Event on SCell is Detected on First SCell, and Second Beam Failure Event on SCell is Detected on Second SCell when a First SCell BFR Procedure for the First Beam Failure Event on the SCell is Ongoing FIG. 4 illustrates a signaling procedure during which a beam failure event is detected when an SCell BFR procedure is ongoing, in accordance with an implementation of the present disclosure.

In action 402, the UE 482 may detect a first beam failure event on a first SCell (SCell #1) 486 based on the BFD RS(s) for the first SCell 486. The first beam failure event may be a beam failure event on the SCell.

In action 404, in response to detecting the first beam failure event on the first SCell 486, the UE 482 may initiate/trigger a first SCell BFR procedure (e.g., with the SpCell 484) to attempt to recover from the first beam failure event. After the first SCell BFR procedure is triggered, the first SCell BFR procedure may be considered ongoing or pending until the SCell BFR procedure is stopped/cancelled or is considered completed.

In some implementations, the first SCell BFR procedure may include at least one of a BFD operation (e.g., action 102 illustrated in FIG. 1) for an SCell, an NBI operation (e.g., action 104 illustrated in FIG. 1) for the SCell, a BFRQ operation (e.g., action 106 illustrated in FIG. 1) for the SCell, and a BFR operation (e.g., action 108 illustrated in FIG. 1) for the SCell.

In action 406, the UE 482 may detect a second beam failure event on a second SCell (SCell #2) 488 based on the BFD RS(s) for the SCell 488 when the first SCell BFR procedure triggered for the first beam failure event is ongoing.

In some implementations, in response to detecting the second beam failure event on the second SCell 488 when the first SCell BFR procedure is ongoing, the UE may not initiate a second SCell BFR procedure for the second beam failure event.

In some implementations, each MAC entity of the UE or a cell group for the UE may be configured with only one single BFR-SR configuration with an index (e.g., via an IE schedulingRequestID-BFR-SCell).

In some implementations, the UE may only be configured with only one single PUCCH resource configuration with an index (e.g., via an IE SchedulingRequestResourceId) for a BFR-SR transmission per BFR-SR configuration.

In some implementations, the UE may handle/perform/initiate only one SCell BFR procedure at a point of time.

In some implementations, the UE may skip/cancel/stop/terminate the second SCell BFR procedure.

In some implementations, the UE may generate a BFR report (e.g., a BFR MAC CE and the sub-header of the BFR MAC CE) to report the beam failure information of both the first SCell(s) and the second SCell(s) via the first SCell BFR procedure.

In some implementations, the UE may, during the first SCell BFR procedure, generate a first BFR report (e.g., a first BFR MAC CE and the sub-header of the first BFR MAC CE) to report to the NW the beam failure information of the first SCell(s), and generate a second BFR report (e.g., a second BFR MAC CE and the sub-header of the second BFR MAC CE) to report to the NW the beam failure information of the second SCell(s).

In some implementations, the UE may suspend the second SCell BFR procedure. The UE may resume/initiate the second SCell BFR procedure after the first SCell BFR procedure is completed.

In some implementations, in response to detecting the second beam failure event on the second SCell 488 when the first SCell BFR procedure is ongoing, the UE may prioritize one of the first SCell BFR procedure and the second SCell BFR procedure over the other.

In some implementations, each SCell BFR procedure (e.g., the first SCell BFR procedure and the second SCell BFR procedure) may be configured with a priority (value/index) by the NW. The UE may determine which SCell BFR procedure has a higher priority based on the priority of the respective SCell BFR procedures.

In some implementations, the UE may determine whether an SCell BFR procedure has a higher priority than another SCell BFR procedure based on the SCell(s) associated with the BFD RSs used in the BFD operation of the SCell BFR procedure.

In some implementations, the UE may determine whether an SCell BFR procedure has a higher priority than another SCell BFR procedure based on the serving cell(s) on which the beam failure event is detected.

In some implementations, if the UE prioritizes the second SCell BFR procedure over the first SCell BFR procedure, the UE may cancel/stop/suspend/terminate the first SCell BFR procedure. In contrast, if the UE prioritizes the first SCell BFR procedure over the second SCell BFR procedure, the UE may cancel/stop/suspend/terminate the second SCell BFR procedure.

In some implementations, a specific timer (e.g., a BFR-SR timer) may be used to control the BFR-SR transmission. For example, when the BFR-SR timer is running, the UE may transmit the BFR-SR on a valid PUCCH resource for the BFR-SR transmission. When the BFR-SR timer is not running, the UE may not transmit the BFR-SR (even if the BFR-SR procedure corresponding to the BFR-SR transmission is pending). In addition, when the BFR-SR timer is running, the corresponding BFR-SR procedure may be considered as pending. When the BFR-SR timer expires, the corresponding BFR-SR procedure may be cancelled.

In some implementations, another specific timer (e.g., a BFR-SR prohibit timer) may be used to control the BFR-SR transmission in the opposite way. For example, when the BFR-SR prohibit timer is running, the UE may not transmit a BFR-SR on a valid PUCCH resource for the BFR-SR transmission (even if the BFR-SR procedure corresponding to the BFR-SR transmission is pending). When the BFR-SR prohibit timer is not running, the UE may transmit the BFR-SR.

In some implementations, a specific counter (e.g., a BFR-SR counter) may be used to control the BFR-SR transmission. For example, the UE may use the BFR-SR counter to count how many times the BFR-SR has been transmitted. The NW may configure the UE with a maximum number for the BFR-SR counter. When the UE transmits a BFR-SR, the UE may increase the BFR-SR counter by 1.

In some implementations, if an SCell BFR procedure is suspended/stopped/cancelled by the UE (e.g., due to the conflict between the SCell BFR procedure and other BFR procedure(s), as illustrated in FIGS. 3 and 4), the UE may perform certain actions described below to operate a BFR-SR timer and/or a BFR-SR prohibit timer.

In some implementations, if the SCell BFR procedure is suspended/stopped/cancelled by the UE, at least one of the following operations (f1)-(f4) may be performed by the UE:
(f1) suspending the BFR-SR timer;
(f2) stopping the BFR-SR timer;
(f3) starting/restarting the BFR-SR prohibit timer; and
(f4) resetting the BFR-SR counter.

In some implementations, if an SCell BFR procedure is resumed, at least one of the following operations (g1)-(g3) may be performed by the UE:
(g1) starting/restarting the BFR-SR timer;
(g2) stopping the BFR-SR prohibit timer; and
(g3) resetting the BFR-SR counter.

In some implementations, the BFR-SR timer may be started or restarted when at least one of the following conditions (h1)-(h5) is satisfied:
(h1) the BFR-SR procedure corresponding the BFR-SR timer is triggered;
(h2) the BFR procedure (for an SCell) corresponding the BFR-SR timer is initiated;
(h3) the beam failure event (for an SCell) is detected;
(h4) the (active) BWP is switched/deactivated; and
(h5) the MAC entity instructs the PHY layer to perform a BFR-SR transmission.

In some implementations, the BFR-SR timer may be stopped when at least one of the following conditions (f1)-(f12) is satisfied:
(f1) the triggered BFR-SR procedure corresponding to the BSR-SR timer is cancelled;
(f2) the BFR procedure (for an SCell) corresponding to the BSR-SR timer is cancelled;
(f3) the BFR procedure (for an SCell) corresponding to the BSR-SR timer is completed;
(f4) the BFR-SR configuration corresponding to the BSR-SR timer is reconfigured;
(f5) any configuration of the BFR configuration (for an SCell) is reconfigured (e.g., a counter, a timer, etc.);
(f6) the corresponding UL resource for BFR-SR, the corresponding UL resource for BFD RS and/or the corresponding UL resource for NBI RS is reconfigured;
(f7) another BFR procedure (for an SpCell or another SCell) is triggered;
(f8) the corresponding SCell(s) is deactivated;
(19) transmission of a MAC PDU, where the MAC PDU may include a BFR report (e.g., a MAC CE) plus its sub-header (for an SCell);
(f10) transmission of a MAC PDU, where the MAC PDU may include a BFR report (e.g., MAC CE) that includes all SCells that detect a beam failure event before the MAC PDU assembly;
(f11) cancellation of a BFR procedure; and
(f12) the (active) BWP is switched/deactivated.

In some implementations, when the BFR-SR timer expires, the UE may perform at least one of the following operations (g1)-(g5):
(g1) cancelling the corresponding BFR-SR procedure (e.g., cancelling a pending BFR-SR procedure);
(g2) cancelling the BFR procedure (for an SCell);
(g3) initiating another BFR procedure (e.g., for an SpCell);
(g4) initiating an RA procedure (on the SpCell); and
(g5) deactivating the corresponding SCell(s).

Figure 5:
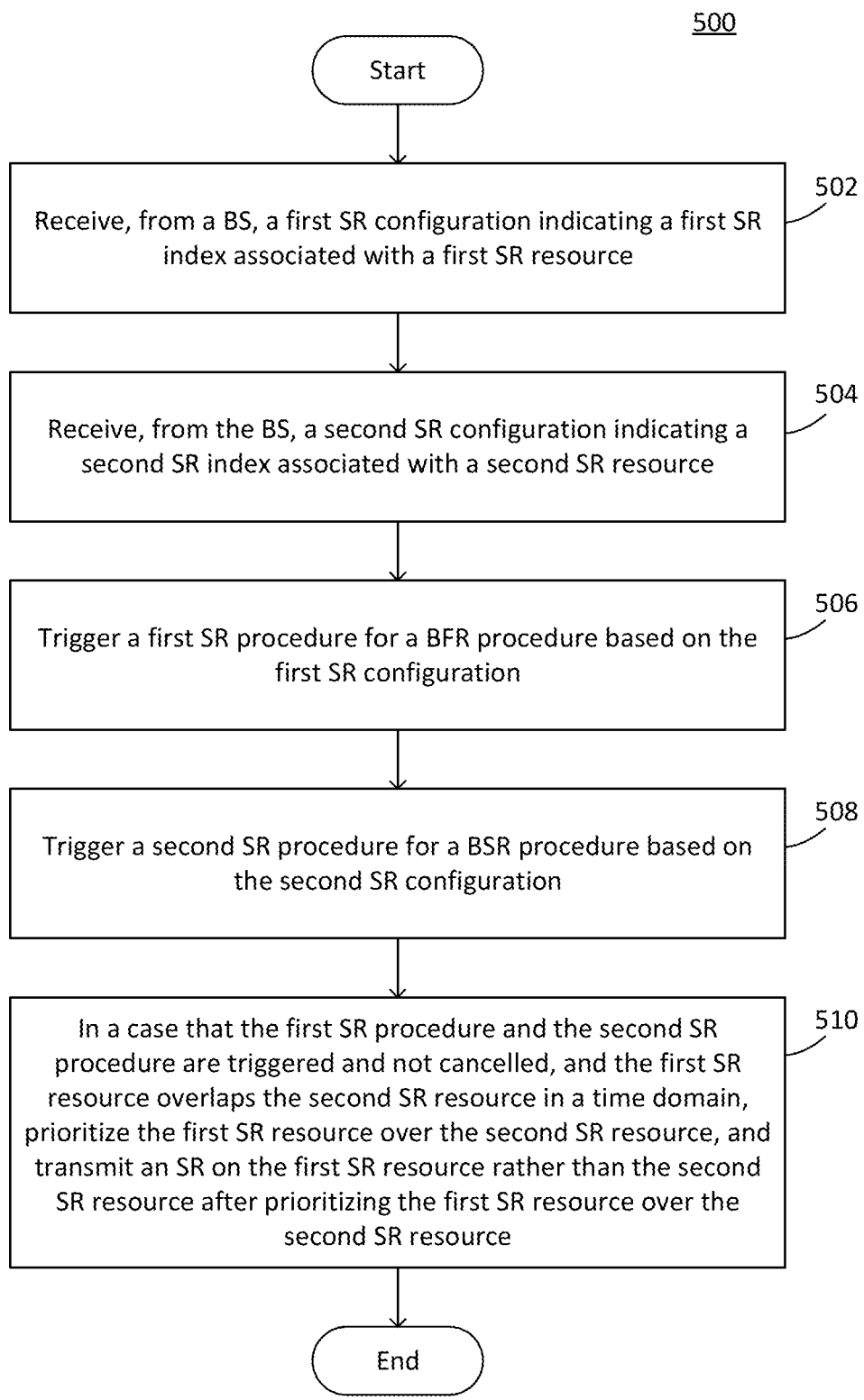
FIG. 5 illustrates a flowchart for a method performed by a UE, in accordance with an implementation of the present disclosure.

FIG. 5 illustrates a flowchart for a method 500 performed by a UE, in accordance with an implementation of the present disclosure. It should be noted that although actions 502, 504, 506, 508 and 510 are delineated as separate actions represented as independent blocks in FIG. 5, these separately delineated actions should not be construed as necessarily order dependent. The order in which the actions are performed in FIG. 5 is not intended to be construed as a limitation, and any number of the described blocks may be combined in any order to implement the method, or an alternate method.

Moreover, one or more of the actions 502, 504, 506, 508 and 510 may be omitted from the method 500 in some of the present implementations.

In action 502, a UE may receive, from a BS, a first SR configuration indicating a first SR index associated with a first SR resource. For example, the first SR configuration may be a BFR-SR configuration. The first SR resource may be an UL resource (e.g., a PUCCH resource) for a BFR-SR transmission. In one implementation, the first SR index may be indicated by an IE schedulingRequestID-BFR-SCell.

In action 504, the UE may receive, from the BS, a second SR configuration indicating a second SR index associated with a second SR resource. For example, the second SR configuration may be a regular SR configuration. The second SR resource may be an UL resource (e.g., PUCCH resource) for a regular SR transmission. The second SR index may be indicated by an IE schedulingRequestID.

In some implementations, both of the first SR resource and the second SR resource may be PUCCH resources. The difference between the first SR resource and the second SR resource may be that the first SR resource is used for transmitting a BFR-SR, while the second SR resource is used for transmitting a regular SR.

In action 506, the UE may trigger a first SR procedure (e.g., a BFR-SR procedure) for a BFR procedure based on the first SR configuration. For example, the BFR procedure may be triggered by the UE when a beam failure event is detected by the UE on an SCell of the BS. In one implementation, the BFR procedure may be an SCell BFR procedure. In addition, the BFR procedure may not be an RA procedure for SpCell BFR. After triggering the BFR procedure, if the UE finds that it is not allocated with available UL resource(s) for a BFR report transmission, the UE may further trigger the first SR procedure to transmit a BFR-SR to request the BS for an available UL resource to transmit a BFR report of the BFR procedure.

In action 508, the UE may trigger a second SR procedure (e.g., a regular SR procedure) for a BSR procedure based on the second SR configuration. For example, the BSR procedure may be triggered by the UE when the UL data for an LCH of the UE becomes available. During the BSR procedure, the UE may further trigger the second SR procedure when the UE finds that it needs UL resources to transmit a BSR MAC CE for the available UL data contained in the LCH.

In some implementations, the SR configuration may include/indicate the information at least one of an SR index, a value for a SR prohibit timer, a value for an SR counter.

As described above, compared to the second SR procedure, the triggering cause of the first SR procedure may be different. For example, the first SR procedure may be triggered in response to a BFR procedure (e.g., for recovering beam failure), and the second SR procedure may be triggered in response to a BSR procedure (e.g., for buffer status reporting). In addition, during the first SR procedure, the UE may attempt to transmit a BFR-SR to the BS to request an UL resource for transmitting a BFR report of the BFR procedure. During the second SR procedure, the UE may attempt to transmit a regular SR to the BS to request an UL resource to transmit a BSR MAC CE for the available UL data contained in an LCH.

In action 510, in a case that the first SR procedure and the second SR procedure are triggered and not cancelled, and also the first SR resource overlaps the second SR resource in a time domain, the UE may prioritize the first SR resource over the second SR resource, and transmit an SR (e.g., a BFR-SR) on the first SR resource (rather than the second SR resource) after prioritizing the first SR resource over the second SR resource. For example, if the first SR resource is prioritized over the second SR resource (e.g., the first SR resource has a higher priority of transmission over the second SR resource), the UE may use the first SR resource to perform the BFR-SR transmission of the first SR procedure, and not use the second SR resource to perform the regular SR transmission of the second SR procedure.

In some implementations, the first SR resource may have a highest priority for (SR) transmission among all SR resources (e.g., the SR resource(s) for the regular SR transmission(s) and the SR resource(s) for the BFR-SR transmission(s)) configured to the UE.

In some implementations, the UE may determine that the first SR resource overlaps the second SR resource when at least a part of the first SR resource overlaps the second SR resource in the time domain.

Figure 6A:
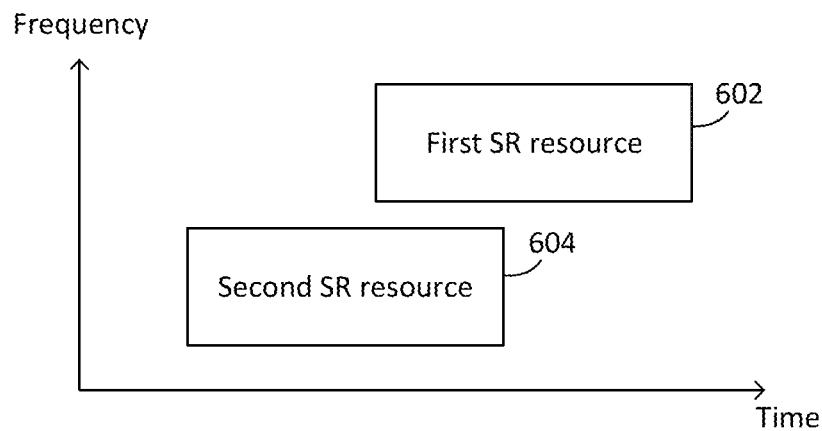
FIG. 6A and FIG. 6B illustrate different cases of at least a part of the first SR resource overlapping the second SR resource in the time domain, in accordance with implementations of the present disclosure.
Figure 6B:
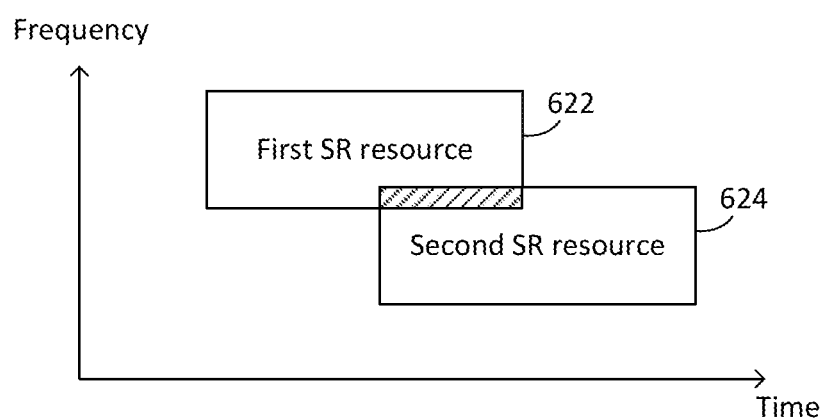

FIG. 6A and FIG. 6B illustrate different cases of at least a part of the first SR resource overlapping the second SR resource in the time domain, in accordance with implementations of the present disclosure.

As illustrated in FIG. 6A, the first SR resource 602 may (partially or completely) overlap the second SR resource 604 only in the time domain. As illustrated in FIG. 6B, the first SR resource 622 may (partially or completely) overlap the second SR resource 624 in the time domain and the frequency domain.

In some implementations, the UE may determine whether the first SR resource overlaps a measurement gap in the time domain. The UE may transmit a BFR-SR on the first SR resource (only) when the first SR resource does not overlap the measurement gap in the time domain.

In some implementations, before transmitting the BFR-SR on the first resource, the UE may determine whether a prohibit timer is running. The BFR-SR may be transmitted on the first resource only when the prohibit timer is not running. The UE may start the prohibit timer after transmitting the BFR-SR on the first resource to avoid excessively frequent BFR-SR transmission. In some implementations, the prohibit timer may be configured by the first SR configuration (e.g., a BFR-SR configuration) from the BS.

In some implementations, the UE may stop the prohibit timer when the first SR procedure is cancelled by the UE or when a MAC PDU that includes a BFR MAC CE is transmitted from the UE to the BS (e.g., the UE has transmitted a BFR report including the BFR MAC CE to the BS).

The following provides the non-limiting descriptions of certain terms.

In some implementations, a CC, cell, and/or serving cell may be an SpCell, a PCell, a PSCell, and/or an SCell.

In some implementations, an SpCell may include PCell and PSCell.

In some implementations, an UL resource may be RACH resource, PUCCH resource, and/or PUSCH resource. The UL resource may be scheduled by dynamic grant (e.g., via PDCCH), RAR, and/or configured by RRC (e.g., type 1/type 2 configured UL grant or pre-configured in RRC configuration).

In some implementations, when a beam failure event of an SCell(s) is detected, the UE may trigger a BFR procedure for the SCell(s).

In some implementations, when a beam failure event of an SpCell is detected, the UE may trigger a BFR procedure for the SpCell.

In some implementations, a BFR procedure may be used to recover from the beam failure event detected on the SpCell(s) and/or the SCell(s).

In some implementations, an RA procedure for SpCell BFR may be performed based on contention free RA procedure and/or contention-based RA procedure. The RA procedure for SpCell BFR may be initiated when the corresponding RA procedure is initiated. The RA procedure for SpCell BFR may be considered ongoing when the corresponding RA procedure is ongoing. The RA procedure for SpCell BFR is stopped when the corresponding RA procedure is stopped. The RA procedure for SpCell BFR is completed when the corresponding RA procedure is completed.

In some implementations, an RA procedure for SpCell BFR may be performed based on contention free RA procedure and/or contention-based RA procedure. The RA procedure for SpCell BFR may be initiated when the corresponding RA procedure is initiated. The RA procedure for SpCell BFR may be considered ongoing when the corresponding RA procedure is ongoing. The RA procedure for SpCell BFR is stopped when the corresponding RA procedure is stopped. The RA procedure for SpCell BFR is completed when the corresponding RA procedure is completed.

In some implementations, a MAC entity/PHY layer/RRC layer may refer to the UE.

In some implementations, the BFR-SR transmission (e.g., action 1A illustrated in FIG. 1) of a BFR procedure triggered for an SCell may be replaced by a PRACH transmission. For example, in the BFR-SR transmission of the BFRQ operation, the UE may perform a PRACH transmission (e.g., transmits preamble) to request an UL resource for BFR report transmission.

In some implementations, the BFR report (MAC CE) transmission of the BFRQ operation (e.g., action 2A illustrated in FIG. 1) of a BFR procedure triggered for an SCell may be replaced by transmitting UL Control Information (UCI). For example, the UCI may include BFR-related information such as (1) the (failed) CC/cell information (e.g., cell index), (2) the (failed) set/group(s) of cells (e.g., the set/group may be pre-configured by NW), (3) the (failed) Transmission Reception Point (TRP) information, (4) the corresponding measurement result (e.g., RSRP, SINR, etc.) of the (failed) CC, set/group of cells, or TRP, (5) the candidate beam information/indicator (or "new beam information") (e.g., indicating one or more qualified beams selected based on the measurement for the NBI RS(s)), (6) the no-new-beam information (e.g., indicating that the UE cannot find any new beam with the RSRP higher than a threshold for the (failed) CC, set/group of cells, TRP, etc.

In some implementations, the NW may refer to an NW node, a BS, a gNB, an eNB, a TRP, or a cell.

In some implementations, a TRP may provide network coverage and directly communicates with UEs. A TRP may also be referred to as distributed unit (DU).

In some implementations, a cell may be composed by one or multiple associated TRPs. For example, the coverage of a cell may be composed by coverage of all associated TRP(s). A cell may be controlled by a BS. A cell may refer to a TRP Group (TRPG).

In some implementations, a serving beam for a UE may be a beam generated by the NW, which may be used to communicate with the UE (e.g. for transmission and/or reception).

In some implementations, in order to cover all possible directions for transmission and/or reception, a number of beams may be required. Beam sweeping may be an operation that generates a subset of the beams in a time interval and changes the generated beam(s) in other time interval(s) (e.g., changing the beam in the time domain). In this way, all possible directions may be covered after several time intervals.

In some implementations, the NW may have multiple TRPs (e.g., centralized or distributed). Each TRP may form multiple beams for transmission and/or reception. The number of beams and the number of simultaneous beams in the time/frequency domain may depend on the number of antenna array elements and the Radio Frequency (RF) at the TRP. The TRP may apply beamforming to both data and control signalling transmission or reception. The number of beams generated concurrently by a TRP may depend on the TRP's capability (e.g. the maximum number of beams generated concurrently by different TRPs in the same cell may be the same, while the maximum number of beams generated concurrently by different TRPs in different cells may be different). In some implementations, beam sweeping may be required for providing the control signalling in different directions.

In some implementations, a beam may be a DL beam or an UL beam. The beam may be a transmission (Tx) beam and/or a reception (Rx) beam. The beam may be UE beam and/or NW beam. The beam may refer to (or associated with) an RS (e.g., an SSB, a CSI-RS, or an SRS), and/or a TCI state.

In some implementations, a (new/candidate) beam may be indicated to the UE via an RS (e.g., SSB, CSI-RS, and/or SRS), and/or a TCI state.

In some implementations, the term "beam" may be replaced by the term "spatial filter." For example, when a UE reports a preferred gNB Tx beam, the UE may select the spatial filter used by the gNB. The term "beam information" may be used to provide information about which beam/spatial filter is being used/selected. In one implementation, individual RSs may be transmitted by applying individual beams (spatial filters). Thus, the beam or the beam information may be represented by RS resource index(es).

In some implementations, a MAC entity (or a UE) may be configured with zero, one, or more BFR-SR configurations. A BFR-SR configuration may consist of one or a set of PUCCH resource for SR transmissions across different BWPs and cells.

In some implementations, the BFR report may include a MAC CE and a sub-header of the MAC CE.

In some implementations, the UE may only use the specific UL resource for transmitting a BFR report. The specific UL resource may be provided by a specific UL grant. For example, the specific UL grant may include a specific indicator to indicate this UL grant is used for transmitting a BFR report. The specific UL grant may have a specific size. For example, the specific size may be the same as the size of the BFR report (e.g., including a BFR MAC CE and the sub-header of the BFR MAC CE). The scheduling (e.g., a PDCCH) of the UL grant may be sent on a specific timing. For example. the specific timing may be after the BFR-SR transmission, within a specific window, or when a specific timer is running (the specific timer may be started when the BFR-SR is transmitted). For example, the specific timing may be the first UL grant received after the UE triggers the BFR-SR procedure or after the UE transmits the BFR-SR. The specific UL resource(s) may have a specific PUSCH duration in the time domain. For example, the PUSCH duration of the specific UL resource(s) may be lower than a threshold. The specific UL resource(s) may map to a specific cell (e.g., the specific UL resource(s) may be allocated on a specific cell). In some implementations, the specific UL resource(s) may be implicitly or explicitly indicated by the NW/BS for a BFR reporting purpose. In this case, the specific UL resource(s) may be only used to transmit the BFR report. In some implementations, the specific UL resource(s) may be scheduled via a specific UL grant, where the specific UL grant may indicate the information that the UL resource(s) is for BFR (purpose). For example, the UL grant may be scheduled by the DCI scrambled with a specific type of RNTI. For example, the UL grant may be scheduled by the DCI with a specific DCI format. For example, the UL grant may be scheduled by the DCI with a specific field to indicate the specific information, e.g., for BFR purpose.

In some implementations, the UL resource(s) for BFR report transmission may satisfy one or more of the following specific conditions: the allowed SCS list (allowedSCS-List), the maximum PUSCH duration (maxPUSCH-Duration), the allowed configured grant type (configuredGrantType1Allowed), and the allowed serving cells (allowedServingCells). If the UL resource satisfies the specific condition(s), the UE may generate the BFR report and transmit the BFR report via the UL resource. In contrast, if the UL resource does not satisfy anyone of the specific condition(s), the UE may not generate the BFR report. The specific condition(s) may be configured in the configuration of a BFR-SR procedure (e.g., the first SR procedure described with reference to FIG. 5) or the configuration of a BFR procedure triggered for an SCell.

In some implementations, the specific UL resource(s) may be associated with a specific UL configured grant configuration (e.g., configuration ID or type1/type2). For example, the specific UL configured grant configuration may be configured for BFR report transmission. If the available UL resource is a configured grant that maps to a specific configured grant configuration, the UE may generate the BFR report and transmit the BFR report via the UL resource. The BS (e.g., a gNB) may indicate to the UE that the configured grant configuration is a specific configured grant configuration via the RRC or DCI signaling.

In some implementations, an overlap between two resources may mean that these two resources partially or fully overlap with each other in the time and/or frequency domain.

In some implementations, an (regular) SR (e.g., used in a regular SR procedure) may be used for requesting UL-SCH resource (e.g., PUSCH resource) for a new transmission. The UE may be configured with zero, one, or more SR configurations. An SR configuration may include a set of PUCCH resources for SR across different BWPs and cells. For an LCH, at most one PUCCH resource for SR may be configured per BWP. Each SR configuration may correspond to one or more LCHs. Each LCH may be mapped to zero or one SR configuration. The SR configuration of the LCH that triggered the BSR (if such a configuration exists) is considered as corresponding SR configuration for the triggered SR. When an SR procedure (e.g., a regular SR procedure or a BFR-SR procedure) is triggered, it may be considered as pending until it is cancelled.

In some implementations, a BFR-SR may be transmitted in the BFR-SR transmission (e.g., action 1A illustrated in FIG. 1) of the BFRQ operation. The BFR-SR may be transmitted on a dedicated SR-like PUCCH resource for BFR. The BFR-SR may be used to inform the NW of a beam failure event and/or used for requesting for an UL-SCH resource for BFR report transmission. The UL resource required by a BFR-SR may (only) be used for BFR (report transmission). The UE may be configured with zero, one, or more BFR-SR configuration. The PUCCH resource for BFR-SR may be configured per BWP, per TRP, per CC, per set of CCs, per cell group (CG), and/or per UE. The PUCCH resource for BFR-SR may be configured on a PCell, a PSCell, and/or a (PUCCH) SCell. The BFR-SR may be transmitted on a PCell, a PSCell, and/or an SCell accordingly. In some implementations, the BFR-SR may be transmitted through a cross-cell transmission (e.g., the beam failure event happens on an SCell, and the BFR-SR corresponding to the beam failure event the is transmitted on a PCell). In some implementations, the BFR-SR configuration may be a specific configuration which is not one of the SR configurations (e.g., the ID of BFR-SR configuration is not shared with the parameter, schedulingRequestid.) In some implementations, the BFR-SR configuration may be one of the SR configurations (e.g., the ID of BFR-SR configuration is shared with the schedulingRequestid.) In some implementations, the BFR-SR may have the highest priority among all SR configurations configured to the UE. In some implementations, the BFR-SR configuration may be configured per BWP, per TRP, per CC, per set of CCs, per CG, and/or per UE.

In some implementations, a BFR report may be transmitted via the BFR report (MAC CE) transmission of the BFRQ operation (e.g., action 2A illustrated in FIG. 1). The BFR report may be transmitted on any available UL grant which could accommodate the BFR report. In some implementations, the BFR report may (only) be transmitted on a specific UL grant which is requested by BFR-SR. In some implementations, whether the specific UL grant is requested by BFR-SR may be indicated based on some implicit or explicit method. In some implementations, the term "BFR MAC CE" may be used to describe a BFR report transmitted by a MAC CE. In some implementations, the BFR report may be transmitted by the MAC CE(s). In some implementations, a BFR report may be transmitted on a PUSCH. In some implementations, a BFR report may include at least one of the following items (h1)-(h6):

(h1) the (failed) CC (or cell) information (e.g., cell index/ID);

(h2) the (failed) set/group(s) of cells (e.g., the set/group may be pre-configured by the NW);

(h3) the (failed) TRP information;

(h4) the corresponding measurement result (e.g., RSRP, SINR, etc.) of the (failed) CC (or the set/group of cells, TRP, etc.);

(h5) the candidate beam information/indicator (or "new beam information") (e.g., one or more qualified beam may be selected based on the measurement for the NBI RS(s)); and (h6) the no-new-beam information (e.g., beam-presence indicator, which may be provided if the UE cannot find any new beam with its RSRP higher than a threshold for the (failed) CC (or the set/group of cells, TRP, etc.)).

In some implementations, a BFD RS may be a set of RSs (e.g., SSB and/or CSI-RS) which may be used for beam failure detection. Different sets of the BFD RSs may be associated with different CCs (or cells), different sets/groups of cells, or different TRPs. For example, if a first set of the BFD RSs is associated a first CC, and the UE detects that the quality of the first set of the BFD RSs is lower than a threshold for a period of time, the UE may determine that the first CC is failed (or a beam failure event is detected). On the other hand, if no BFD RSs are provided for a CC (or cell) for beam failure detection, the UE may perform beam monitoring based on the activated TCI-state for a PDCCH of the CC (or cell). The BFD RS may be transmitted in (the active BWP of) the current CC or another CC (e.g., within the same frequency band). In some implementations the BFD RS and the BFR-SR may be configured in the same configuration.

In some implementations, an NBI RS may be a set of RSs (e.g., SSB and/or CSI-RS) which may be used for new beam identification. Different sets of the NBI RSs may be configured for different CCs (or cells), sets/groups of cells, or TRPs. For example, if a first set of the NBI RS is configured for a first CC (or cell), and the UE detects a beam failure event on the first CC (or cell), the UE may select a new beam/candidate beam based on the measurement results for the first set of the NBI RSs. For example, the UE may select a beam having the highest RSRP (or having an RSRP larger than a threshold) within the first set of the NBI RS as the new beam for BFR. The UE may include the information of the NBI RS in a BFR report. The NBI RS (e.g., an SSB and/or a CSI-RS) may be transmitted in (the active BWP of) the CC which is configured with the beam failure recovery mechanism or another CC within the same frequency band.

Figure 7:
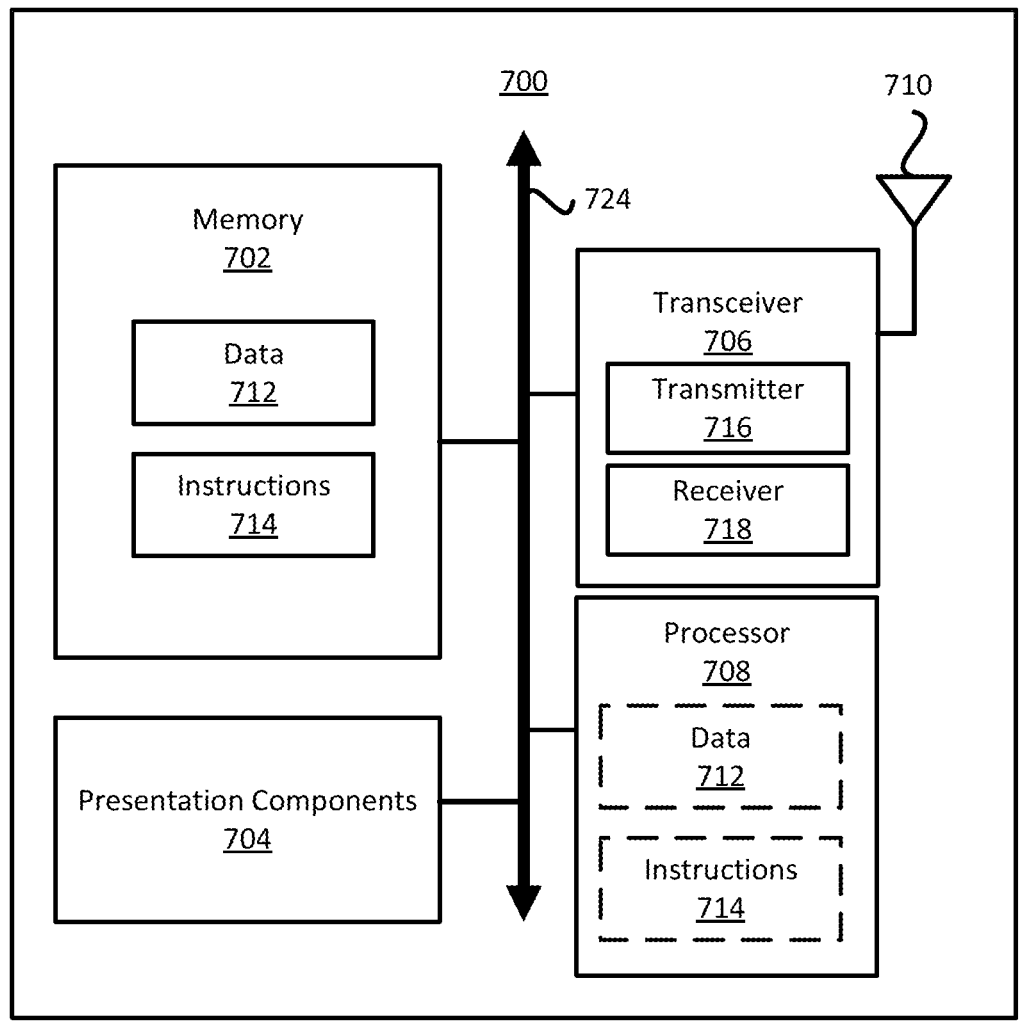
FIG. 7 illustrates a block diagram of a node for wireless communication, in accordance with various aspects of the present disclosure.

FIG. 7 illustrates a block diagram of a node for wireless communication, in accordance with various aspects of the present disclosure. As illustrated in FIG. 7, a node 700 may include a transceiver 706, a processor 708, a memory 702, one or more presentation components 704, and at least one antenna 710. The node 700 may also include an RF spectrum band module, a BS communications module, a network communications module, and a system communications management module, Input/Output (I/O) ports, I/O components, and power supply (not explicitly illustrated in FIG. 7). Each of these components may be in communication with each other, directly or indirectly, over one or more buses 724. In one implementation, the node 700 may be a UE or a BS that performs various functions described herein, for example, with reference to FIGS. 1 through 6.

The transceiver 706 having a transmitter 716 (e.g., transmitting/transmission circuitry) and a receiver 718 (e.g., receiving/reception circuitry) may be configured to transmit and/or receive time and/or frequency resource partitioning information. In some implementations, the transceiver 706 may be configured to transmit in different types of subframes and slots including, but not limited to, usable, non-usable and flexibly usable subframes and slot formats. The transceiver 706 may be configured to receive data and control channels.

The node 700 may include a variety of computer-readable media. Computer-readable media can be any available media that can be accessed by the node 700 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 702 may include computer-storage media in the form of volatile and/or non-volatile memory. The memory 702 may be removable, non-removable, or a combination thereof. For example, the memory 702 may include solid-state memory, hard drives, optical-disc drives, etc. As illustrated in FIG. 7, the memory 702 may store computer-readable and/or -executable instructions 714 (e.g., software codes) that are configured to, when executed, cause the processor 708 to perform various functions described herein, for example, with reference to FIGS. 1 through 6. Alternatively, the instructions 714 may not be directly executable by the processor 708 but may be configured to cause the node 700 (e.g., when compiled and executed) to perform various functions described herein.

The processor 708 (e.g., having processing circuitry) may include an intelligent hardware device, a Central Processing Unit (CPU), a microcontroller, an ASIC, etc. The processor 708 may include memory. The processor 708 may process the data 712 and the instructions 714 received from the memory 702, and information through the transceiver 706, the base band communications module, and/or the network communications module. The processor 708 may also process information to be sent to the transceiver 706 for transmission through the antenna 710, to the network communications module for transmission to a core network.

One or more presentation components 704 may present data indications to a person or other device. Examples of presentation components 704 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE) for Scheduling Request (SR) resource prioritization, the method comprising:
receiving, from a Base Station (BS), a first SR configuration indicating a first SR index associated with a first SR resource;
receiving, from the BS, a second SR configuration indicating a second SR index associated with a second SR resource;
triggering a first SR procedure for a Beam Failure Recovery (BFR) procedure based on the first SR configuration;
triggering a second SR procedure for a Buffer Status Report (BSR) procedure based on the second SR configuration; and
in a case that the first SR procedure and the second SR procedure are triggered and not cancelled, and the first SR resource overlaps the second SR resource in a time domain,
prioritizing the first SR resource over the second SR resource; and
transmitting an SR on the first SR resource rather than the second SR resource after prioritizing the first SR resource over the second SR resource.

2. The method of claim 1, wherein the first SR resource and the second SR resource are Physical Uplink Control Channel (PUCCH) resources.

3. The method of claim 1, further comprising:
determining that the first SR resource overlaps the second SR resource when at least a part of the first SR resource overlaps the second SR resource in the time domain.

4. The method of claim 1, wherein the BFR procedure is triggered by the UE when a beam failure event is detected by the UE on a Secondary Cell (SCell) of the BS.

5. The method of claim 1, wherein the BSR procedure is triggered by the UE when Uplink (UL) data for a logical channel of the UE becomes available.

6. The method of claim 1, further comprising:
determining whether a prohibit timer configured by the first SR configuration is running; and
transmitting the SR on the first SR resource when the prohibit timer is not running.

7. The method of claim 6, further comprising:
starting the prohibit timer after transmitting the SR on the first SR resource.

8. The method of claim 6, further comprising:
stopping the prohibit timer when the first SR procedure is cancelled by the UE or when a Medium Access Control (MAC) Protocol Data Unit (PDU) that includes a BFR MAC Control Element (CE) is transmitted from the UE to the BS.

9. The method of claim 1, further comprising:
determining whether the first SR resource overlaps a measurement gap in the time domain; and
transmitting the SR on the first SR resource when the first SR resource does not overlap the measurement gap in the time domain.

10. The method of claim 1, wherein the first SR resource has a highest priority for SR transmission among all SR resources configured to the UE.

11. A User Equipment (UE) comprising:
a memory; and
at least one processor coupled to the memory, the at least one processor being configured to:
receive, from a Base Station (BS), a first Scheduling Request (SR) configuration indicating a first SR index associated with a first SR resource;
receive, from the BS, a second SR configuration indicating a second SR index associated with a second SR resource;
trigger a first SR procedure for a Beam Failure Recovery (BFR) procedure based on the first SR configuration;

trigger a second SR procedure for a Buffer Status Report (BSR) procedure based on the second SR configuration; and in a case that the first SR procedure and the second SR procedure are triggered and not cancelled, and the first SR resource overlaps the second SR resource in a time domain,
prioritize the first SR resource over the second SR resource; and
transmit an SR on the first SR resource rather than the second SR resource after prioritizing the first SR resource over the second SR resource.

12. The UE of claim 11, wherein the first SR resource and the second SR resource are Physical Uplink Control Channel (PUCCH) resources.

13. The UE of claim 11, wherein the at least one processor is further configured to:
determine that the first SR resource overlaps the second SR resource when at least a part of the first SR resource overlaps the second SR resource in the time domain.

14. The UE of claim 11, wherein the BFR procedure is triggered by the UE when a beam failure event is detected by the UE on a Secondary Cell (SCell) of the BS.

15. The UE of claim 11, wherein the BSR procedure is triggered by the UE when Uplink (UL) data for a logical channel of the UE becomes available.

16. The UE of claim 11, wherein the at least one processor is further configured to:
determine whether a prohibit timer configured by the first SR configuration is running; and
transmit the SR on the first SR resource when the prohibit timer is not running.

17. The UE of claim 16, wherein the at least one processor is further configured to:
start the prohibit timer after transmitting the SR on the first SR resource.

18. The UE of claim 16, wherein the at least one processor is further configured to:
stop the prohibit timer when the first SR procedure is cancelled by the UE or when a Medium Access Control (MAC) Protocol Data Unit (PDU) that includes a BFR MAC Control Element (CE) is transmitted from the UE to the BS.

19. The UE of claim 11, wherein the at least one processor is further configured to:
determine whether the first SR resource overlaps a measurement gap in the time domain; and
transmit the SR on the first SR resource when the first SR resource does not overlap the measurement gap in the time domain.

20. The UE of claim 11, wherein the first SR resource has a highest priority for SR transmission among all SR resources configured to the UE.

* * * * *